United States Patent
Tarao et al.

(10) Patent No.: US 9,259,618 B2
(45) Date of Patent: Feb. 16, 2016

(54) GOLF BALL

(71) Applicant: Dunlop Sports Co., Ltd., Kobe-shi, Hyogo (JP)

(72) Inventors: Toshiyuki Tarao, Kobe (JP); Kuniyasu Horiuchi, Kobe (JP)

(73) Assignee: DUNLOP SPORTS CO. LTD., Kobe-shi (JP)

(*) Notice: Subject to any disclaimer, the term of this patent is extended or adjusted under 35 U.S.C. 154(b) by 212 days.

(21) Appl. No.: 13/908,488

(22) Filed: Jun. 3, 2013

(65) Prior Publication Data

US 2013/0331205 A1    Dec. 12, 2013

(30) Foreign Application Priority Data

| Jun. 10, 2012 | (JP) | 2012-131447 |
| Jun. 10, 2012 | (JP) | 2012-131448 |
| Jun. 10, 2012 | (JP) | 2012-131449 |
| Jun. 10, 2012 | (JP) | 2012-131450 |
| Jun. 15, 2012 | (JP) | 2012-136295 |
| Jun. 15, 2012 | (JP) | 2012-136296 |
| Jun. 15, 2012 | (JP) | 2012-136297 |
| Jun. 15, 2012 | (JP) | 2012-136298 |

(51) Int. Cl.

| *A63B 37/12* | (2006.01) |
| *A63B 37/14* | (2006.01) |
| *A63B 37/00* | (2006.01) |
| *C09D 175/04* | (2006.01) |
| *C08G 18/06* | (2006.01) |
| *C08G 18/48* | (2006.01) |
| *C08G 18/50* | (2006.01) |
| *C08G 18/66* | (2006.01) |
| *C08G 18/75* | (2006.01) |

(Continued)

(52) U.S. Cl.
CPC ......... *A63B 37/0022* (2013.01); *A63B 37/0021* (2013.01); *A63B 37/0096* (2013.01); *A63B 47/008* (2013.01); *C08G 18/06* (2013.01); *C08G 18/4854* (2013.01); *C08G 18/5045* (2013.01); *C08G 18/6677* (2013.01);

(Continued)

(58) Field of Classification Search
CPC .... C08G 18/4854; C08G 18/40; C08G 18/48; C08G 18/06; C08G 18/28; C08G 18/5021; C08G 18/5045; C08G 18/65; C08G 18/755; C08G 18/7831; C09D 175/04; C09D 175/08; C08L 75/04; A63B 37/0021; A63B 37/0022; A63B 37/0096; A63B 37/0031; A63B 37/0087; A63B 2037/0079

See application file for complete search history.

(56) References Cited

U.S. PATENT DOCUMENTS 6,096,851 A * 8/2000 Maruoka et al. ............ 528/85
6,150,462 A  11/2000 Rajagopalan et al.

(Continued)

FOREIGN PATENT DOCUMENTS

| JP | 4-109968 A | 4/1992 |
| JP | 2000-288125 A | 10/2000 |

(Continued)

OTHER PUBLICATIONS

Extended European Search Report for European Application No. 13170884.4, dated Oct. 15, 2013.

*Primary Examiner* — John E Simms, Jr.
(74) *Attorney, Agent, or Firm* — Birch Stewart Kolasch & Birch, LLP

(57) ABSTRACT

The present invention provides a golf ball comprising a golf ball body and a paint film formed on a surface of the golf ball body, wherein the paint film has a storage modulus (E') in a temperature range from 120° C. to 150° C. measured under the specific measurement conditions using a dynamic viscoelasticity measuring apparatus of $1.00 \times 10^7$ dyn/cm$^2$ or more and $1.00 \times 10^8$ dyn/cm$^2$ or less and a loss tangent (tan δ) at the temperature of 10° C. of 0.050 or more.

23 Claims, 12 Drawing Sheets

(51) Int. Cl.
  *C08G 18/78* (2006.01)
  *C08G 18/79* (2006.01)
  *C09D 175/08* (2006.01)
  *A63B 47/00* (2006.01)
  C08G 18/28 (2006.01)
  C08L 75/04 (2006.01)

(52) U.S. Cl.
  CPC ......... *C08G 18/755* (2013.01); *C08G 18/7831* (2013.01); *C08G 18/792* (2013.01); *C09D 175/04* (2013.01); *C09D 175/08* (2013.01); *A63B 37/008* (2013.01); *A63B 37/0031* (2013.01); *A63B 37/0045* (2013.01); *A63B 37/0074* (2013.01); *A63B 37/0075* (2013.01); *A63B 37/0087* (2013.01); *A63B 2037/0079* (2013.01); *A63B 2225/02* (2013.01); *C08G 18/28* (2013.01); *C08L 75/04* (2013.01)

(56) References Cited

U.S. PATENT DOCUMENTS

| | | | |
|---|---|---|---|
| 6,210,295 B1 * | 4/2001 | Yoneyama | 473/378 |
| 6,309,706 B2 * | 10/2001 | Maruoka et al. | 427/385.5 |
| 6,391,955 B1 | 5/2002 | Rajagopalan et al. | |
| 6,454,667 B1 * | 9/2002 | Iwami | 473/378 |
| 2001/0034398 A1 * | 10/2001 | Ohira et al. | 524/500 |
| 2003/0153403 A1 * | 8/2003 | Endo et al. | 473/371 |
| 2003/0176242 A1 | 9/2003 | Mano | |
| 2003/0187152 A1 * | 10/2003 | Shimura et al. | 525/450 |
| 2003/0207039 A1 * | 11/2003 | Takahashi et al. | 427/385.5 |
| 2004/0116623 A1 * | 6/2004 | Isogawa et al. | 525/453 |
| 2004/0157682 A1 | 8/2004 | Morgan et al. | |
| 2004/0235586 A1 * | 11/2004 | Chen | 473/351 |
| 2005/0101412 A1 | 5/2005 | Sajima et al. | |
| 2010/0137487 A1 * | 6/2010 | Feldma et al. | 524/315 |
| 2010/0167847 A1 * | 7/2010 | Tarao et al. | 473/378 |
| 2011/0053708 A1 | 3/2011 | Isoagawa et al. | |
| 2011/0224020 A1 * | 9/2011 | Tachibana et al. | 473/373 |
| 2011/0244989 A1 * | 10/2011 | Tarao et al. | 473/385 |

FOREIGN PATENT DOCUMENTS

| | | | | |
|---|---|---|---|---|
| JP | 2003-265650 A | | 9/2003 | |
| JP | 2004-243124 A | | 9/2004 | |
| JP | 2006-075209 A | | 3/2006 | |
| JP | 2006-075210 | * | 3/2006 | ............ A63B 37/00 |
| JP | 2006-075210 A | | 3/2006 | |
| JP | 2011-067595 A | | 4/2011 | |
| JP | 2011-217820 A | | 11/2011 | |
| WO | WO 99/23903 A1 | | 5/1999 | |

* cited by examiner (a)

(b)

GOLF BALL

FIELD OF THE INVENTION

The present invention relates to an improvement of spin performance of a golf ball.

DESCRIPTION OF THE RELATED ART

A paint film is formed on a surface of the golf ball body. The improvement of the golf ball properties has been proposed by improving the paint film.

Japanese Patent Publication No. 2011-67595 A discloses a golf ball comprising a core, a cover situated on the external side of the core, and a paint layer situated on the external side of the cover, wherein the cover has a Shore D hardness of 61 or less, and the paint layer has a Martens hardness of 2.0 mgf/μm² or less. The golf ball is excellent in spin performance, stability of the spin rate, and durability of the paint layer.

Japanese Patent Publication No. 2011-217820 A discloses a golf ball comprising a golf ball body and a paint film formed on a surface of the golf ball body, wherein the paint film has a Martens hardness of 2.0 mgf/μm² or less, and a ratio (50% modulus/10% modulus) of 50% modulus to 10% modulus of 1.6 or more. The golf ball has a high spin rate on approach shots under the wet condition and rough condition.

Japanese Patent Publications No. 2006-75209 A and 2006-75210 A propose a golf ball that stops quickly on the green by increasing the launch angle of the golf ball. Japanese Patent Publication No. 2006-75209 A discloses a golf ball comprising a golf ball body and a paint film covering the golf ball body, wherein a resin component constituting the paint film is cured by a polyamide type curing agent and the golf ball has a static friction coefficient of 0.22 or less. Japanese Patent Publication No. 2006-75210 A discloses a golf ball comprising a golf ball body and a paint film covering the golf ball body, wherein the paint film contains a metal particle.

Japanese Patent Publication No. 2000-288125 A discloses a golf ball having an improved abrasion resistance and durability. The golf ball having an excellent durability comprises a core, a cover, and at least one paint layer formed on the cover, wherein the cover has a Shore D hardness of 50 to 65 and a flexural modulus of 1,000 to 2,000 kgf/cm², and at least outermost layer of the paint has a 10% modulus of 5 to 50 kgf/cm².

Japanese Patent Publication No. 2003-265650 A proposes a golf ball having an improved spin retention without sacrificing the requirements for the paint film. Japanese Patent Publication No. 2003-265650 A discloses a golf ball comprising a core, at least one cover layer covering the core, and a paint film formed on an outer surface of the cover, wherein a thickness of the paint film is 25 μm to 125 μm, a 50% modulus of the paint film is 5 MPa to 50 MPa, and a value R expressed by an equation (1) is from 0.01 to 0.5:

$$R = PL/CL/1,000 \quad (1)$$

where CL (mm) represents a thickness of an outermost layer of the cover, and PL (μm) represents a thickness of the paint film.

Golf balls have a large number of dimples on the surface thereof. The dimples disturb the air flow around the golf ball during flight to cause turbulent flow separation. By causing the turbulent flow separation, separation points of the air from the golf ball shift backwards leading to a reduction of drag. The turbulent flow separation promotes the displacement between the separation point on the upper side and the separation point on the lower side of the golf ball, which results from the back spin thereby enhancing the lift force that acts upon the golf ball. The reduction of drag and the enhancement of lift force are referred to as a "dimple effect". Excellent dimples efficiently disturb the air flow. The excellent dimples produce a long flight distance.

There have been various proposals for a dimple pattern. JP H4-109968 discloses a golf ball whose hemisphere is divided into six units. These units have dimple patterns that are equivalent to each other. JP2004-243124 discloses a dimple pattern in which an octahedron is used for dividing a region near a pole and an icosahedron is used for dividing a region near an equatorial line.

SUMMARY OF THE INVENTION

The highest concern about golf balls for golf players is a flight distance on driver shots. However, it is needless to say that not only the flight distance on driver shots but also the accuracy of approach shots is important for score-making. The golf ball employing a relatively soft thermoplastic polyurethane as the cover material is excellent in controllability on 40-yard to 100-yard approach shots. However, the controllability on approach shots less than 40 yards, especially 10-yard to 20-yard approach shots around the greens has been hardly examined.

The present invention has been achieved in view of the above circumstances. An object of the present invention is to provide a golf ball having high controllability on approach shots less than 40-yard, especially approach shots around the greens (about 10-yard to 20-yard). Another object of the present invention is to provide a golf ball having high controllability on both approach shots less than 40 yards and 40-yard to 100-yard approach shots. Yet another object of the present invention is to provide a golf ball having high controllability on approach shots less than 40 yards, especially approach shots around the greens (about 10-yard to 20-yard), while controlling flight performance on driver shots. Yet another object of the present invention is to provide the above golf ball having a good shot feeling as well.

As described above, employing the relatively soft thermoplastic polyurethane as the cover material improves the controllability on 40-yard to 100-yard approach shots. However, the inventors of the present invention have found that the controllability on approach shots less than 40 yards, especially approach shots around the greens (about 10-yard to 20-yard) is affected by the mechanical properties of a paint film formed on a golf ball body, and have achieved the present invention.

The present invention provides a golf ball comprising a golf ball body and a paint film formed on a surface of the golf ball body, wherein the paint film has a storage modulus (E') in a temperature range from 120° C. to 150° C. measured under following measurement conditions using a dynamic viscoelasticity measuring apparatus of $1.00 \times 10^7$ dyn/cm² or more and $1.00 \times 10^8$ dyn/cm² or less and a loss tangent (tan δ) at the temperature of 10° C. of 0.050 or more.

<Measurement Conditions>
Measuring mode: tensile mode
Measuring temperature: −50° C. to 150° C.
Temperature increase rate: 4° C./min.
Oscillation frequency: 10 Hz
Measuring strain: 0.1%

The present inventors have found that although the paint films have little difference in a storage modulus (E') at the low temperature region, the paint films have a difference in the storage modulus (E') at the high temperature region ranging from 120° C. to 150° C., and that the storage modulus (E') at the temperature region ranging from 120° C. to 150° C. affects the spin performance on approach shots less than 40 yards. Further, the larger loss tangent (tan δ) of the paint film means that the provided energy will be converted into other energies such as heat. The present inventors have found that the spin performance on approach shots less than 40 yards will be further enhanced as the loss tangent (tan δ) becomes larger. The paint film used in the present invention preferably has a loss tangent (tan δ) of 0.050 or more.

According to the present invention, it is possible to provide a golf ball having high controllability on approach shots less than 40 yards, especially approach shots around the greens (about 10-yard to 20-yard). Further, it is possible to provide a golf ball having high controllability on both approach shots less than 40 yards and 40-yard to 100-yard approach shots. Yet further, it is possible to provide a golf ball having high controllability on approach shots less than 40 yards, especially approach shots around the greens (about 10-yard to 20-yard), while controlling flight performance on driver shots. Yet further, it is possible to provide the above golf ball having a good shot feeling as well.

DESCRIPTION OF THE PREFERRED EMBODIMENT

Figure 1:
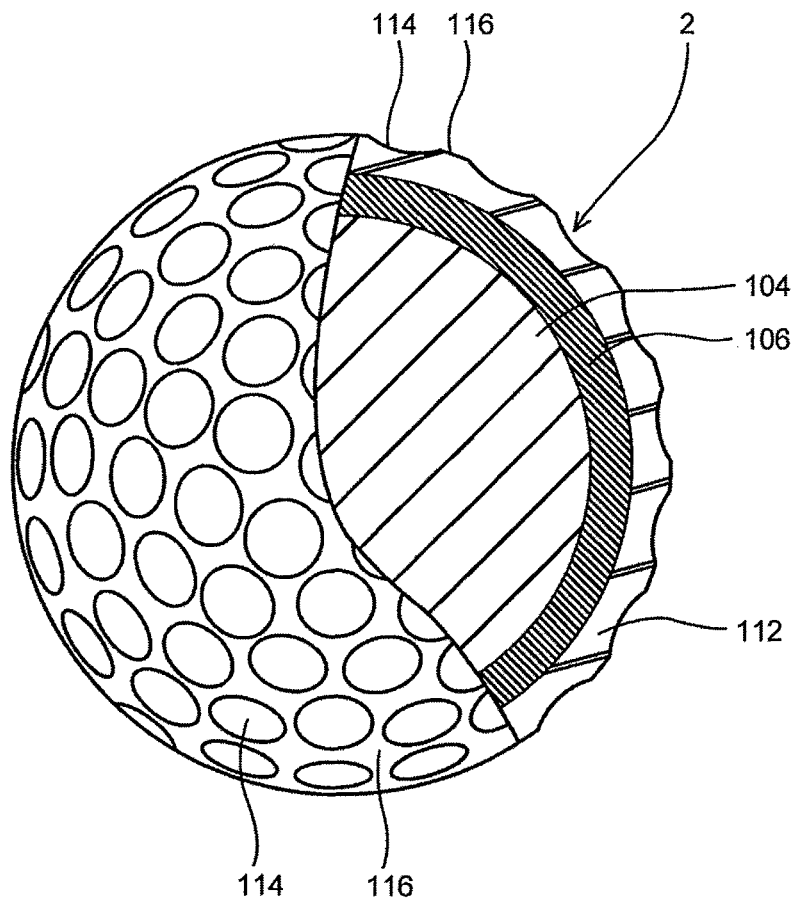
FIG. 1 is a partially cutaway view showing the golf ball according to the preferable embodiment of the present invention.

The present invention is directed to a golf ball comprising a golf ball body and a paint film formed on a surface of the golf ball body, wherein the paint film has a storage modulus (E') in a temperature range from 120° C. to 150° C. measured under following measurement conditions using a dynamic viscoelasticity measuring apparatus of $1.00 \times 10^7$ dyn/cm$^2$ or more and $1.00 \times 10^8$ dyn/cm$^2$ or less and a loss tangent (tan δ) at the temperature of 10° C. of 0.050 or more.

<Measurement Conditions>
Measuring mode: tensile mode
Measuring temperature: −50° C. to 150° C.
Temperature increase rate: 4° C./min.
Oscillation frequency: 10 Hz
Measuring strain: 0.1%

Use of the paint film having the storage modulus (E') in the temperature range from 120° C. to 150° C. measured under the above measurement conditions using a dynamic viscoelasticity measuring apparatus of $1.00 \times 10^7$ dyn/cm$^2$ or more and $1.00 \times 10^8$ dyn/cm$^2$ or less lowers a launch angle and increases a spin rate on approach shots less than 40 yards. As a result, the golf ball of the present invention has high controllability on approach shots less than 40-yard. From this aspect, the storage modulus (E') in the temperature range from 120° C. to 150° C. is preferably $9.00 \times 10^7$ dyn/cm$^2$ or less, and more preferably $8.00 \times 10^7$ dyn/cm$^2$ or less. If the storage modulus (E') is too low, the paint film still remains tacky. Therefore, the storage modulus (E') in the temperature range from 120° C. to 150° C. is preferably $1.20 \times 10^7$ dyn/cm$^2$ or more, and more preferably $1.50 \times 10^7$ dyn/cm$^2$ or more.

The paint film of the golf ball of the present invention preferably has a plateau region where the storage modulus becomes almost constant in the range from 120° C. to 150° C. when measuring the viscoelasticity thereof. From this aspect, the absolute value ($|E'_{120}-E'_{150}|$) of the difference between the storage modulus ($E'_{120}$) at the temperature of 120° C. and the storage modulus ($E'_{150}$) at the temperature of 150° C. is preferably $2.00 \times 10^7$ dyn/cm$^2$ or less, more preferably $1.00 \times 10^7$ dyn/cm$^2$ or less.

The paint film of the present invention has a loss tangent (tan δ) at the temperature of 10° C. of 0.050 or more. The paint film having the loss tangent (tan δ) at the temperature of 10° C. of 0.050 or more lowers a launch angle and increases a spin rate on approach shots less than 40 yards. The larger loss tangent (tan δ) of the paint film means that the energy provided will be converted into other energies such as heat. In the present invention, the loss tangent (tan δ) at the temperature of 10° C. is preferably 0.060 or more, and more preferably 0.070 or more. Upper limit on the loss tangent (tan δ) at the temperature of 10° C. is preferably 1.0.

A film for measuring the dynamic viscoelasticity is prepared from the paint which forms the paint film. A method for producing the measurement film and a method for measuring the dynamic viscoelasticity will be described later.

The golf ball of the present invention has a golf ball body and a paint film formed on a surface of the golf ball body. The base resin constituting the paint film is not limited, as long as the above dynamic viscoelasticity is satisfied. The base resin preferably includes a polyurethane obtained by a reaction between a polyol and a polyisocyanate. The polyurethane is suitable for designing the dynamic viscoelasticity, and is excellent in the durability as well as adhesion. The storage modulus (E') and the loss tangent (tan δ) of the resultant paint film can be controlled, for example, by choosing appropriately kinds and mixing ratio of the polyol and the polyisocyanate. The storage modulus in the plateau region can be controlled by a molecular weight and a crosslinking density of the polyurethane.

Examples of the polyol include a low molecular weight polyol having a molecular weight of less than 500 and a high molecular weight polyol having an average molecular weight of 500 or more. Examples of the low molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylol propane, and hexane triol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; a urethane polyol; and an acrylic polyol. The above polyol may be used solely or in combination of at least two of them.

In the present invention, as the polyol component, preferably used is a urethane polyol. The urethane polyol is a compound having a plurality of urethane bonds in the molecule thereof, and having at least two hydroxyl groups in the molecule thereof. The urethane polyol is, for example, a hydroxyl group terminated urethane prepolymer, which is obtained by a reaction between a polyisocyanate component and a polyol component, under a condition that the hydroxyl groups of the polyol component is excessive to the isocyanate groups of the polyisocyanate component.

The polyisocyanate component constituting the urethane polyol is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). The polyisocyanate may be used solely or in combination of at least two of them.

As the polyol component constituting the urethane polyol, the compounds exemplified as the polyol can be used. In the present invention, preferred is the polyol component including a triol component and diol component as the polyol component constituting the urethane polyol. The triol component preferably includes trimethylolpropane. The diol component preferably includes polyoxytetramethylene glycol. A mixing ratio (triol component/diol component) of the triol component to the diol component is preferably 0.2 or more, more preferably 0.5 or more, and is preferably 6.0 or more, more preferably 5.0 or less in a mass ratio.

The acrylic polyol is an acrylic resin or acrylic polymer having a plurality of hydroxyl groups in a molecule thereof, and is obtained, for example, by copolymerizing a (meth)acrylic monomer having a hydroxyl group and a (meth)acrylic monomer having no hydroxyl group.

Examples of the (meth)acrylic monomer having a hydroxyl group include (meth)acrylic acid esters having a hydroxyl group, such as 2-hydroxyethyl(meth)acrylate, 2-hydroxypropyl(meth)acrylate, 2-hydroxybutyl(meth)acrylate, alkylene glycol mono(meth)acrylate, and polyalkylene glycol mono(meth)acrylate. These (meth)acrylic monomers having a hydroxyl group may be used individually or in combination of two or more of them.

Examples of the (meth)acrylic monomer having no hydroxyl group include (meth)acrylic unsaturated carboxylic acids such as (meth)acrylic acid; (meth)acrylic acid esters such as methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, hexyl (meth)acrylate, 2-ethylhexyl (meth)acrylate, cyclohexyl (meth)acrylate, octyl (meth)acrylate, and decyl (meth)acrylate; and another (meth)acrylic monomer such as (meth)acrylonitrile, and (meth)acrylamide. These (meth)acrylic monomers having no hydroxyl group may be used individually or in combination of two or more of them. In the present invention, the term "(meth)acrylic" means "acrylic" and/or "methacrylic."

Further, in addition to the (meth)acrylic monomer, the acrylic polyol may contain another monomer component which has a hydroxyl group and/or another monomer component which has no hydroxyl group, as long as they do not impair the effects of the present invention. Examples of another monomer component which has a hydroxyl group include unsaturated alcohols such as 3-methyl-3-butene-1-ol, 3-methyl-2-butene-1-ol, 2-methyl-3-butene-2-ol, 2-methyl-2-butene-1-ol, 2-methyl-3-butene-1-ol, and allyl alcohol. Examples of another monomer component which has no hydroxyl group include: aromatic vinyl compounds such as styrene and α-methyl styrene; and ethylenically unsaturated carboxylic acids such as maleic acid and itaconic acid. These other monomer components may be used individually or in combination of two or more of them.

The hydroxyl value of the polyol is preferably 10 mg KOH/g or more, and more preferably 15 mg KOH/g or more, and even more preferably 20 mg KOH/g or more, and is preferably 400 mg KOH/g or less, preferably 300 mg KOH/g or less, more preferably 200 mg KOH/g or less, even more preferably 170 mg KOH/g or less, and most preferably 160 mg KOH/g or less. If the hydroxyl value of the polyol component falls within the above range, the adhesion of the paint film to the golf ball body improves. In the present invention, the hydroxyl value can be measured by using, for example, an acetylization method, in accordance with JIS K 1557-1.

The weight average molecular weight of the polyol is preferably 500 or more, and more preferably 550 or more, and even more preferably 600 or more, and is preferably 150,000 or less, and more preferably 140,000 or less, and even more preferably 130,000 or less. If the weight average molecular weight of the polyol component falls within the above range, the water-resistance and impact-resistance of the paint film can be enhanced. The weight average molecular weight of the polyol component can be measured, for example, by gel permeation chromatography (GPC), using polystyrene as a standard material, tetrahydrofuran as an eluate, and an organic solvent system GPC columns (for example, by using "Shodex (registered trademark) KF series" available from Showa Denko K.K.).

Specific examples of the polyol component are 121 B available from Wayaku Paint Co.; Nippollan 800, Nippollan 1100 available from Nippon Polyurethane Industry Co., Ltd; Burnock D6-627, Burnock D8-436, Burnock D8-973, Burnock11-408 available from DIC Corporation; Desmophen 650 MPA, Desmophen 670, Desmophen 1150, Desmophen A160X available from Sumika Bayer Urethane Co., Ltd; Hariacron 2000, Hariacron 8500H available from Harima Chemicals, Inc; Polin #950 available from Shinto Paint Co., Ltd.

Next, the polyisocyanate will be described. As the polyisocyanate, for example, compounds having at least two isocyanate groups can be exemplified.

The polyisocyanate includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI) and para-phenylene diisocyanate (PPDI); and an alicyclic or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), norbornene diisocyanate (NBDI) and derivatives thereof. In the present invention, two or more kinds of polyisocyanates are preferably used as the polyisocyanate.

Examples of the derivative of the polyisocyanate include: an isocyanurate of diisocyanate; an adduct obtained through a reaction between a diisocyanate and a low molecular weight triol such as trimethylolpropane or glycerin; an allophanate-modified product; and a biuret-modified product. It is preferable that a free diisocyanate is removed from the derivative of the polyisocyanate. One example of the allophanate-modified product is a trifunctional polyisocyanate which is obtained by further reacting a diisocyanate with a urethane bond formed through a reaction between a diisocyanate and a low molecular weight diol. The biuret-modified product is, for example, a trifunctional polyisocyanate which is represented by the following formula (1). The isocyanurate of diisocyanate is, for example, a trifunctional polyisocyanate which is represented by the following formula (2). In the formulae (1) and (2), R represents a residue where isocyanate groups are removed from the diisocyanate.

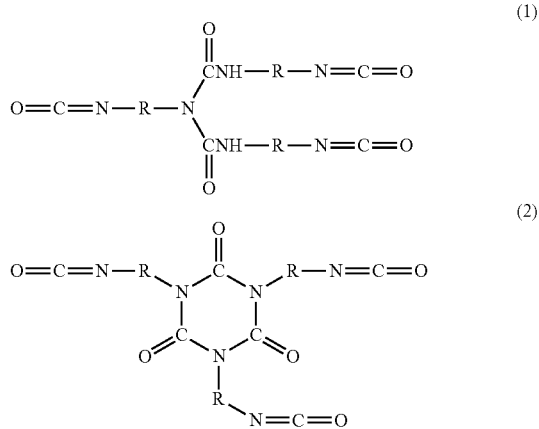

In the present invention, as the polyisocyanate, preferably used are a derivative of hexamethylene diisocyanate and a derivative of isophorone diisocyanate. As the derivative of hexamethylene diisocyanate, preferably used are a biuret-modified product and an isocyanurate of hexamethylene diisocyanate. As the derivative of isophorone diisocyanate, preferably used is an isocyanurate of isophorone diisocyanate.

A mixing ratio (HDI derivative/IPDI derivative) of the derivative of hexamethylene diisocyanate to the derivative of isophorone diisocyanate is preferably 80/20 to 50/50, and more preferably 65/35 to 55/45 in a mass ratio. A mixing ratio (biuret-modified product/isocyanurate) of the biuret-modified product of hexamethylene diisocyanate to the isocyanurate of hexamethylene diisocyanate is preferably 20/40 to 40/20, and more preferably 25/35 to 35/25 in a mass ratio.

The polyisocyanate preferably has an isocyanate content (NCO %) of 0.5 mass % or more, more preferably 1 mass % or more, even more preferably 2 mass % or more, and preferably has an isocyanate content (NCO %) of 45 mass % or less, more preferably 40 mass % or less, even more preferably 35 mass % or less. The isocyanate content (NCO %) of the polyisocyanate can be defined by the following expression.

NCO(%)=100×[mole number of an isocyanate group in the polyisocyanate×42(molecular weight of NCO)]/[total mass (g) of the polyisocyanate]

Specific examples of the polyisocyanate are Burnock D-800, Burnock DN-950, Burnock DN-955 available from DIC corporation; Desmodur N75MPA/X, Desmodur N3300, Desmodur L75 (C), Sumidur E21-1 available from Sumika Bayer Urethane CO., Ltd; Coronate HX, Coronate HK available from Nippon Polyurethane Industry Co., Ltd; Duranate 24A-100, Duranate 21S-75E, Duranate TPA-100, Durante TKA-100 available from Asahi Kasei Corporation; Vestanat T1890 available from Degussa.

In a reaction between the polyol and the polyisocyanate, the molar ratio (NCO/OH) of the isocyanate group (NCO) of the polyisocyanate to the hydroxyl group (OH) of the polyol is preferably 0.1 or more, and more preferably 0.2 or more. If the molar ratio (NCO/OH) is less than 0.1, the curing reaction may become insufficient. Further, if the molar ratio (NCO/OH) is too large, the amount of the isocyanate groups is excessive, and the appearance of the obtained paint film may deteriorate. In addition, the obtained paint film may be hard and fragile. Thus, the molar ratio (NOC/OH) is preferably 1.0 or less, more preferably 0.9 or less, even more preferably 0.8 or less. The reason why the appearance of the obtained paint film deteriorates if the amount of the isocyanate group is excessive is that an excessive amount of isocyanate groups in the paint may promote a reaction between the moisture in the air and the isocyanate groups, thereby generating a lot of carbon dioxide gas.

The paint film of the golf ball of the present invention is preferably formed from a paint containing a polyol and two or more kinds of polyisocyanates. Preferable example of the paint is a so-called two-component curing type paint containing the polyol as a base material and the two or more kinds of polyisocyanates as a curing agent. The paint may be either a waterborne paint mainly containing water as a dispersion medium or a solvent-base paint mainly containing an organic solvent as a dispersion medium. In the case of the solvent-base paint, preferable solvents are, for example, toluene, isopropyl alcohol, xylene, methyl ethyl ketone, methyl isobutyl ketone, ethyleneglycol monomethyl ether, ethyl benzene, propyleneglycol monomethyl ether, isobutyl alcohol, and ethyl acetate.

The paint may further contain additives such as a filler, an ultraviolet absorber, an antioxidant, a light stabilizer, a fluorescent brightener, an anti-blocking agent, a leveling agent, a slip agent and a viscosity modifier, which are generally contained in the paint for a golf ball, where necessary.

Next, the applying method of the curing type paint used in the present invention will be described. The method of applying the curing type paint is not limited, and includes conventional methods, for example, spray coating method or electrostatic coating method.

In the case of applying the paint with the air gun, the polyol component and the polyisocyanate component may be fed with the respective pumps and continuously mixed through the line mixer located in the stream line just before the air gun, and the obtained mixture can be air-sprayed. Alternatively, the polyol component and the polyisocyanate component can be air-sprayed respectively with the spray gun having the device for controlling the mixing ratio thereof. The paint application may be conducted by spraying the paint one time or overspraying the paint multiple times.

The curing type paint applied to the golf ball body is dried at the temperature ranging from 30° C. to 70° C. for 1 hour to 24 hours to form a paint film.

The thickness of the paint film after drying is preferably, without limitation, 5 μm or more, more preferably 6 μm or more, even more preferably 10 μm or more, most preferably 15 μm or more. If the thickness is less than 5 μm, the paint film is likely to wear off due to the continued use. Further, thickening the paint film increase the spin rate on approach shots. The thickness of the paint film is preferably 50 μm or less, more preferably 45 μm or less, even more preferably 40 μm or less. If the thickness is more than 50 μm, the effect of the dimples is lowered, and thus the flying performance of the golf ball tends to be low. The thickness of the paint film can be measured, for example, by observing a cross section of the golf ball using a microscope (VHX-1000 available from Keyence Corporation). In the case of overpainting the paint, a total thickness of the whole paint films formed preferably falls within the above range.

In the present invention, the paint film formed on a surface of the golf ball body preferably has a martens hardness of 4.0 mgf/μm$^2$ or less, more preferably 3.5 mgf/μm$^2$ or less, even more preferably 3.0 mgf/μm$^2$ or less. The martens hardness can be measured by a later described method and is suitable for measuring a hardness in a micro region. If the martens hardness is 4.0 mgf/μm$^2$ or less, the paint film is soft enough to produce a high spin rate. There is no lower limit on the martens hardness, but the martens hardness is preferably 0.01 mgf/μm$^2$ or more. If the martens hardness is too low, the paint film is too soft and tacky.

The paint film preferably has a 10% elastic modulus of 160 kgf/cm$^2$ or less, more preferably 130 kgf/cm$^2$ or less, and even more preferably 110 kgf/cm$^2$ or less. If the 10% elastic modulus is 160 kgf/cm$^2$ or less, the paint film is soft and the spin rate on approach shots increases. There is no lower limit on the 10% elastic modulus, but the 10% elastic modulus is preferably 2 kgf/cm$^2$ or more, more preferably 5 kgf/cm$^2$ or more. If the 10% elastic modulus is too low, the paint film becomes too soft and tacky. Thus, the feeling becomes bad.

The golf ball construction is not limited, as long as the golf ball of the present invention comprises a golf ball body and a paint film formed on a surface of the golf ball body. The golf ball body of the present invention may be a one-piece golf ball, a two-piece golf ball, a three-piece golf ball, a four-piece golf ball, or a multi-piece golf ball such as a five or more-piece golf ball. The present invention can be applied appropriately to any one of the above golf balls. In the preferable embodiment, the golf ball of the present invention has a core and at least one cover layer enclosing the core.

FIG. 1 is a partially cutaway sectional view showing the golf ball 2. The golf ball 2 comprises a spherical core 104, an intermediate layer 106 covering the spherical core 104, and a cover 112 covering the intermediate layer 106. Plurality of dimples 114 are formed on a surface of the cover 112. Other portions than dimples 114 on the surface of the golf ball 2 are referred to as land 116. The golf ball 2 is provided with a paint layer and a mark layer outside the cover, but these layers are not depicted.

The golf ball body used in the present invention preferably comprises a core and at least one cover layer enclosing the core. The cover preferably has a hardness of 10 or more, more preferably 15 or more, even more preferably 20 or more, and preferably has a slab hardness of 75 or less, more preferably 73 or less, even more preferably 70 or less in Shore D hardness. If the cover has a slab hardness of 75 or less in Shore D hardness, the spin rate on 40-yard to 100-yard approach shots becomes higher, thereby improving the controllability. The hardness of the cover is a slab hardness obtained by measuring the cover composition molded into a sheet form.

Especially, in the case of the spin type golf ball focusing on the controllability, the cover preferably has a slab hardness of 10 or more, more preferably 15 or more, even more preferably 20 or more, and preferably has a slab hardness less than 55, more preferably 50 or less, even more preferably 45 or less in Shore D hardness. If the slab hardness of the cover composition is less than 55 in Shore D hardness, the spin rate on 40-yard to 100-yard approach shots becomes higher, and thus the golf ball tends to stop on the green quickly. In addition, the shot feeling is improved. Further, if the slab hardness of the cover composition is 10 or more in Shore D hardness, the abrasion resistance improves.

In the case of the distance type golf ball focusing on the flight distance, the cover preferably has a slab hardness of 55 or more, more preferably 58 or more, even more preferably 60 or more, and preferably has a slab hardness of 75 or less, more preferably 73 or less, even more preferably 70 or less in Shore D hardness. If the slab hardness of the cover composition is 55 or more in Shore D hardness, the resultant golf ball has a high launch angle and a low spin rate on driver shots, long and middle iron shots, and thus travels a great distance. If the slab hardness of the cover composition is 75 or less in Shore D hardness, the resultant golf ball has an excellent durability.

Examples of the cover material constituting the cover include, various resins such as an ionomer resin, a polyester resin, polyurethane resins like a thermoplastic urethane resin and a thermosetting urethane resin, and a polyamide resin; and various thermoplastic elastomers such as a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" available from BASF Japan Ltd, and a thermoplastic styrene elastomers having a trade name "Rabalon (registered trademark)" and a thermoplastic polyester elastomer having a trade name "Primalloy" commercially available from Mitsubishi Chemical Corporation, and the like. These cover materials may be used solely or in combination of two or more types thereof.

The cover in the present invention may contain a pigment component such as a white pigment (for example, titanium oxide), a blue pigment, a red pigment, or the like, a specific gravity adjusting agent such as calcium carbonate, barium sulfate, or the like, a dispersant, an antioxidant, an ultraviolet absorber, a light stabilizer, a fluorescent material or a fluorescent brightener, or the like, as long as they do not impair the performance of the cover.

An embodiment for molding a cover from a cover composition is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding). After the cover is molded, the molds are opened and the golf ball body is ejected from the molds, and as necessary, the golf ball body is preferably subjected to surface treatments such as deburring, cleaning, and sandblast. If desired, a mark may be formed.

A plurality of dimples are preferably formed on the surface of the golf ball body of the present invention. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the ratio of the sum of the areas of all the dimples to the surface area of a phantom sphere of a golf ball is referred to as an occupation ratio Y. The phantom sphere is a golf ball (spherical body) when assuming that there is no dimples on the surface thereof. In the golf ball of the present invention, the occupation ratio Y of the dimple is preferably 60% or more, and is preferably 95% or less. If the occupation ratio Y is too high, the contact area between the paint film formed on the surface of the golf ball body and the golf club face when the golf ball is hit becomes small. As a result, the effect of increasing the spin rate on approach shots around the greens becomes small. Further, if the occupation ratio Y is too low, since the effect of dimples becomes small, the flight performance is lowered.

The occupation ratio Y of the dimples is preferably designed according to the desired golf ball performance. If the occupation ratio Y of the dimples is less than 75%, the contact area between a clubface and paint film increases. Thus, the controllability on approach shots less than 40 yards is further enhanced. However, if the occupation ratio Y of the dimples is too low, the flight performance deteriorates on driver shots. Thus, the occupation ratio Y of the dimples is preferably 60% or more. From these aspects, the occupation ratio Y of the dimples is more preferably 62% or more, and is preferably 73% or less.

If the occupation ratio Y of the dimples is 75% or more, the flight performance on driver shots improves. On the other hand, the contact area between a clubface and the paint film becomes smaller as the occupation ratio Y of the dimples becomes larger. However, by employing the paint film used in the present invention, it is possible to sufficiently impart the controllability on approach shots less than 40 yards, even if the contact area is small. From the aspect of the controllability on approach shots less than 40 yards, the occupation ratio Y of the dimples is preferably 95% or less. From the aspect of these points, the occupation ratio Y of the dimples is more preferably 77% or more, and is preferably 93% or less.

If the occupation ratio Y of the dimples is 60% or more and less than 75%, it is preferred that the loss tangent (tan δ) and the occupation ratio Y of the dimples satisfy the following formula.

$$4.285 \leq \tan\delta \times Y \leq 517.59$$

If the loss tangent (tan δ) and the occupation ratio Y of the dimples satisfy the above formula, it is possible to strike a balance between the controllability on approach shots less than 40 yards and the flight performance on driver shots. From this aspect, the loss tangent (tan δ) and the occupation ratio Y of the dimples preferably further satisfy the following formula.

$$4.485 \leq \tan\delta \times Y \leq 17.39$$

If the occupation ratio Y of the dimples is 75% or more and 95% or less, it is preferred that the loss tangent (tan δ) and the occupation ratio Y of the dimples satisfy the following formula:

$$5.44 \leq \tan\delta \times Y \leq 21.45$$

If the loss tangent (tan δ) and the occupation ratio Y of the dimples satisfy the above formula, it is possible to strike a balance between the controllability on approach shots less than 40 yards and flight performance on driver shots. From this aspect, the loss tangent (tan δ) and the occupation ratio Y of the dimples preferably further satisfy the following formula:

$$5.64 \leq \tan\delta \times Y \leq 21.25$$

The term "an area of the dimple" refers to the area enclosed by the contour line when observing the central point of the golf ball from infinity. In the case of the circular dimple, the area of the dimple S is expressed by the following formula:

$$S=(Dm/2)^2 \cdot \pi (Dm: \text{diameter of the dimple})$$

Figure 2:
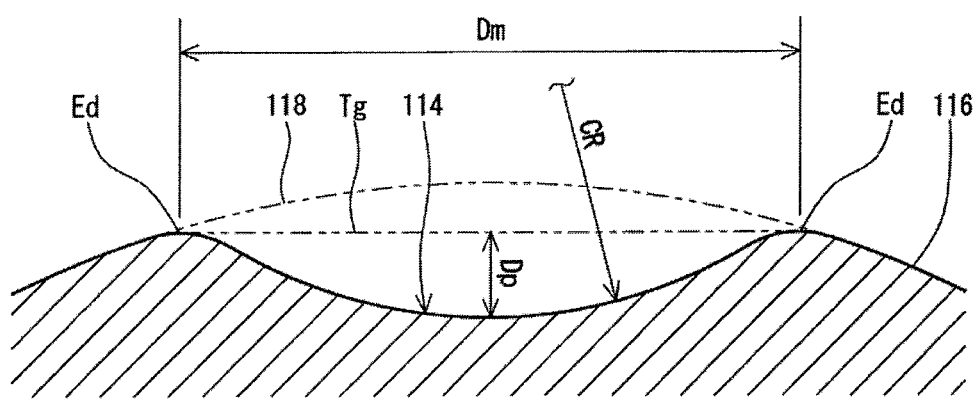
FIG. 2 is an enlarged cross-sectional view of a part of the golf ball.

FIG. 2 shows a cross section along a plane passing through the center of the dimple 114 and the center of the golf ball 2. In FIG. 2, the vertical direction is the depth direction of the dimple 114. In FIG. 2, a chain double-dashed line 118 indicates the phantom sphere. The surface of the phantom sphere is the surface of the golf ball 2 when it is assumed that no dimple 114 exists. The dimple 114 is recessed from the surface of the phantom sphere. The land 116 coincides with the surface of the phantom sphere. In the present embodiment, the cross-sectional shape of each dimple 114 is substantially a circular arc.

In FIG. 2, a double ended arrow Dm indicates the diameter of the dimple 114. The diameter Dm is the distance between one tangent point Ed and another tangent point Ed when a tangent line Tg is drawn tangent to the farthest opposite ends of the dimple 114. Each tangent point Ed is also the edge of the dimple 114. The edge Ed defines the contour of the dimple 114. In FIG. 2, a double ended arrow Dp indicates the depth of the dimple 114. The depth Dp is the distance between the deepest part of the dimple 114 and the tangent line Tg.

The diameter Dm of each dimple is preferably 2.0 mm or more, and is preferably 6.0 mm or less. The dimple having a diameter Dm of 2.0 mm or more contributes to turbulization. From this aspect, the diameter Dm is more preferably 2.2 mm or more, and even more preferably 2.4 mm or more. The dimple having a diameter Dm of 6.0 mm or less does not impair a fundamental feature of the golf ball 2 being substantially a sphere. From this respect, the diameter Dm is more preferably 5.8 mm or less, and even more preferably 5.6 mm or less.

In FIG. 2, an arrow CR indicates the curvature radius of the dimple 114. The curvature radius CR is calculated by the following mathematical formula (1).

$$CR=(Dp^2+Dm^2/4)/(2*Dp) \quad (1)$$

Also in the case of a dimple 114 whose cross-sectional shape is not a circular arc, the curvature radius CR is approximately calculated on the basis of the above mathematical formula (1).

From the standpoint that a sufficient occupation ratio X is achieved, the total number of the dimples is preferably 300 or more, more preferably 310 or more, and even more preferably 320 or more. From the standpoint that each dimple can contribute to turbulization, the total number is preferably 500 or less, more preferably 490 or less, and particularly preferably 480 or less.

In the present invention, the "volume of the dimple" means the volume of the portion surrounded by the surface of the dimple and the plane including the contour of the dimple. From the aspect of suppression of excessive rising of the golf ball 2 during flight, the total volume of all the dimples is preferably 250 mm³ or more, more preferably 260 mm³ or more and even more preferably 270 mm³ or more. From the aspect of suppression of dropping of the golf ball 2 during flight, the total volume is preferably 450 mm³ or less, more preferably 440 mm³ or less, and even more preferably 430 mm³ or less.

From the aspect of suppression of excessive rising of the golf ball 2 during flight, the depth Dp of each dimple 114 is preferably 0.05 mm or more, more preferably 0.08 mm or more, and even more preferably 0.10 mm or more. From the aspect of suppression of dropping of the golf ball 2 during flight, the depth Dp is preferably 0.60 mm or less, more preferably 0.45 mm or less, and even more preferably 0.40 mm or less.

The golf ball preferably has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, and more preferably 42.80 mm or less. The golf ball preferably has a mass of 40 g or more and 50 g or less. From the aspect of obtaining greater inertia, the golf ball more preferably has a mass of 44 g or more, and even more preferably 45.00 g or more. From the aspect of satisfying a regulation of USGA, the golf ball preferably has a mass of 45.93 g or less.

When the golf ball of the present invention has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 1.7 mm or more, more preferably 1.8 mm or more, even more preferably 1.9 mm or more, and is preferably 4.5 mm or less, more preferably 4.4 mm or less, even more preferably 4.3 mm or less. If the compression deformation amount is 1.7 mm or more, the golf ball does not become excessively hard, and thus exhibits the good shot feeling. On the other hand, if the compression deformation amount is 4.5 mm or less, the resilience is enhanced.

In the case of the small compression deformation amount, the compression deformation amount is preferably 1.7 mm or more, more preferably 1.8 mm or more, even more preferably 1.9 mm or more, and is preferably less than 3.0 mm, more preferably 2.9 mm or less, even more preferably 2.8 mm or less. If the compression deformation amount is less than 3.0 mm, the low launch angle and high spin rate are provided due to the small compression deformation amount. As a result, the controllability on approach shots less than 40 yards becomes high, and the spin rate on 40-yard to 100 yard approach shots also becomes high, thus the golf ball is easy to stop on the green.

On the other hand, in case of the large compression deformation amount, the compression deformation amount is preferably 3.0 mm or more, more preferably 3.1 mm or more, even more preferably 3.2 mm or more, and is preferably 4.5 mm or less, more preferably 4.4 mm or less, even more preferably 4.3 mm or less. If the compression deformation amount is 3.0 mm or more, the spin rate on driver shots is reduced and the shot feeling becomes excellent.

In the preferable embodiment of the golf ball of the present invention, a product (loss tangent (tan δ)×compression deformation amount (mm)) of the loss tangent (tan δ) and the above compression deformation amount is preferably 0.14 or more, more preferably 0.16 or more, even more preferably 0.18 or more, and is preferably 0.68 or less, more preferably 0.66 or less, even more preferably 0.64 or less. If the product is 0.14 or more, the shot feeling becomes better, and if the product is 0.68 or less, the resilience becomes better.

In the case that the compression deformation amount is 1.7 mm or more and less than 3.0 mm, the product is preferably 0.14 or more, more preferably 0.16 or more, even more preferably 0.18 or more, and is preferably 0.65 or less, more preferably 0.63 or less, even more preferably 0.61 or less. If the product is 0.14 or more, the shot feeling becomes much better.

In the case that the compression deformation amount is 3.0 mm or more and 4.5 mm or less, the product is preferably 0.23 or more, more preferably 0.25 or more, even more preferably 0.27 or more, and is preferably 0.68 or less, more preferably 0.66 or less, even more preferably 0.64 or less. If the product is 0.68 or less, the resilience becomes much higher.

Next, the core used for the wound golf ball, two-piece golf ball, multi-piece golf ball, and the one-piece golf ball body will be explained.

For the core or the one-piece golf ball body, a conventionally known rubber composition (hereinafter simply referred to as "core rubber composition" occasionally) can be used. The core or the one-piece golf ball body can be molded by, for example, heat-pressing a rubber composition containing a base rubber, a crosslinking initiator, and a co-crosslinking agent.

As the base rubber, typically preferred is the high cis-polybutadiene having cis-1,4-bond in a proportion of 40% or more, more preferably 70% or more, even more preferably 90% or more in view of its superior repulsion property. The co-crosslinking agent includes; for example, an α,β-unsaturated carboxylic acid having 3 to 8 carbon atoms or a metal salt thereof, more preferably a metal salt of acrylic acid or methacrylic acid. As the metal constituting the metal salt, for example, zinc, magnesium, calcium, aluminum and sodium may be used, and among them, zinc is preferred. The amount of the co-crosslinking agent to be used is preferably 20 parts or more, and is preferably 50 parts or less. As the crosslinking initiator, an organic peroxide is preferably used. Examples of the organic peroxide for use in the present invention are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. The core rubber composition may further contain an organic sulfur compound. As the organic sulfur compound, diphenyl disulfides, thiophenols, or thionaphthols may be preferably used. The amount of the organic sulfur compound is preferably 0.1 part by mass or more, more preferably 0.3 part by mass or more, and is preferably 5.0 parts by mass or less, more preferably 3.0 parts by mass or less with respect to 100 parts by mass of the base rubber. The core rubber composition may further contain a carboxylic acid and/or a salt thereof. The carboxylic acid and/or the salt thereof preferably includes a carboxylic acid having 1 to 30 carbon atoms and/or a salt thereof. The content thereof is preferably 1 part by mass or more and 40 parts by mass or less with respect to 100 parts by mass of the base rubber.

The core rubber composition may further contain a weight adjusting agent such as zinc oxide or barium sulfate, an antioxidant, or a colored powder in addition to the base rubber, the crosslinking initiator, the co-crosslinking agent and the organic sulfur compound. The conditions for press-molding the core rubber composition should be determined appropriately depending on the rubber composition. The press-molding is preferably carried out for 10 to 60 minutes at the temperature of 130° C. to 200° C. or the press-molding is preferably carried out in a two-step heating, for example, for 20 to 40 minutes at the temperature of 130° C. to 150° C., and continuously for 5 to 15 minutes at the temperature of 160° C. to 180° C.

In the case that the golf ball of the present invention is a three-piece golf ball, a four-piece golf ball, or a multi-piece golf ball (including five or more-piece golf ball), the intermediate layer is formed between the core and the outermost cover layer. The material for the intermediate layer includes thermoplastic resins such as a polyurethane resin, an ionomer resin, a polyamide resin, and polyethylene; and thermoplastic elastomers such as a styrene elastomer, a polyolefin elastomer, a polyurethane elastomer, a polyester elastomer; and a cured product of a rubber composition. Herein, examples of the ionomer resin include one prepared by neutralizing at least a part of carboxyl groups in a copolymer composed of ethylene and an $\alpha,\beta$-unsaturated carboxylic acid with a metal ion, and one prepared by neutralizing at least a part of carboxyl groups in a terpolymer composed of ethylene, an $\alpha,\beta$-unsaturated carboxylic acid and an $\alpha,\beta$-unsaturated carboxylic acid ester with a metal ion. The intermediate layer may further contain a specific gravity adjusting agent such as barium sulfate, tungsten and the like, an antioxidant, and a pigment. The intermediate layer sometimes may be merely referred to as "inner cover layer" or "outer core layer" according to the construction of golf balls.

The golf ball of the present invention comprises a golf ball body and a paint film formed on a surface of the golf ball body, and preferably has a coefficient of friction calculated using a contact force tester of 0.35 or more and 0.60 or less.

In the present invention, the coefficient of the friction calculated using the contact force tester is a coefficient of friction between a golf ball and a collisional plate when the golf ball collides with the collisional plate disposed inclined at a predetermined angle to a flying direction of the golf ball. By using the contact force tester, a time function Fn(t) of contact force in the direction perpendicular to the collisional plate and a time function Ft(t) of contact force in the direction parallel to the collisional plate are concurrently measured; and a maximum value of a time function M(t) which is a ratio of Ft(t) to Fn(t) represented by the following equation is defined as a coefficient of friction.

$$M(t)=Ft(t)/Fn(t)$$

Figure 3:
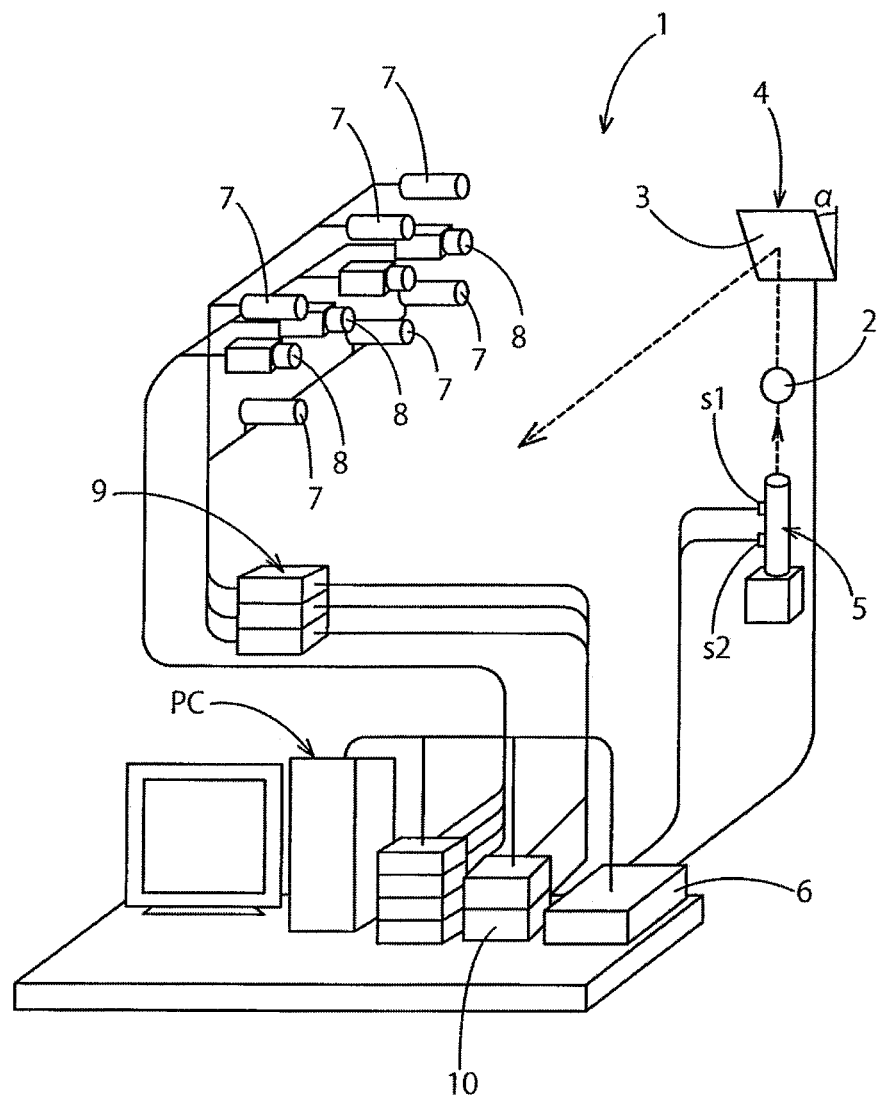
FIG. 3 is a schematic view of a contact force tester used in the present invention.
Figure 4:
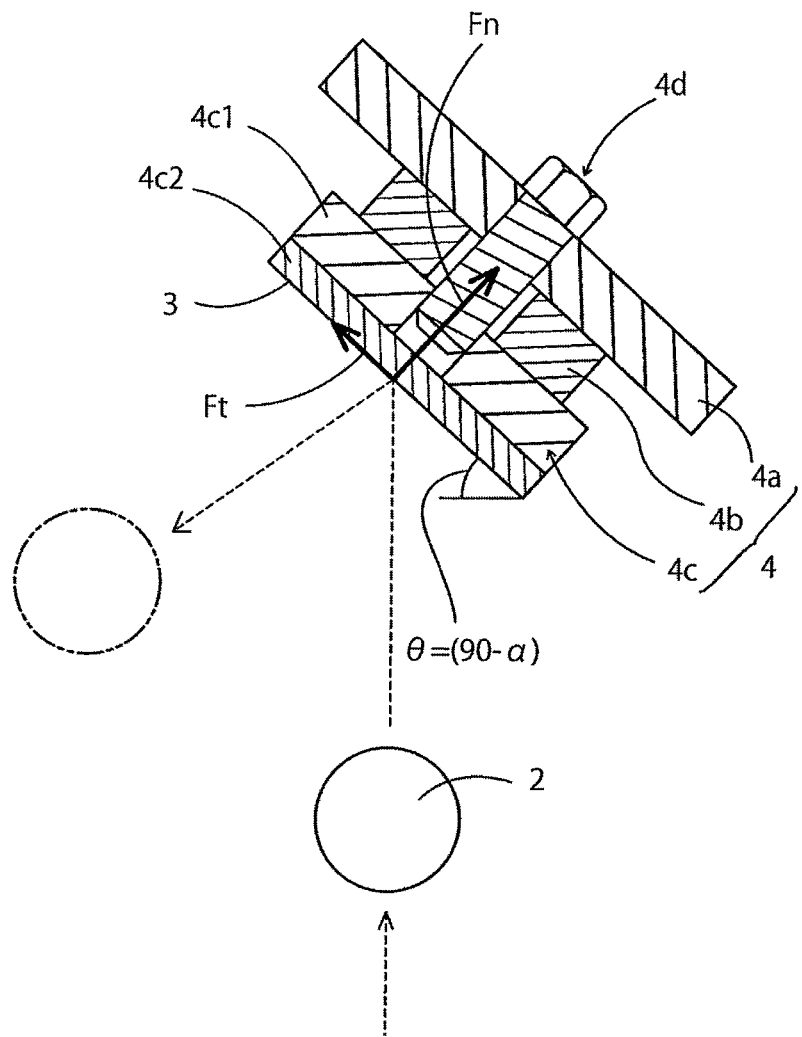
FIG. 4 is a partially enlarged cross-sectional view of a collisional plate of the contact force tester.

The method of calculating the friction coefficient of the present invention will be described based on FIGS. 3 to 5. FIG. 3 is a contact force tester for measuring a coefficient of friction. FIG. 4 is an enlarged cross-sectional view of a collisional plate 4 that a golf ball collides with.

The contact force tester 1 makes pseudo conditions of hitting a golf ball with a club face, and enables to measure various forces at that time. The contact force tester 1 includes a launcher 5 that launches a golf ball 2 in an upward and perpendicular direction and a collisional plate 4 that is positioned on the upper side of the launched golf ball 2. The collisional plate 4 has a striking face 3 that the golf ball 2 collides with.

Since a distance between the launcher 5 and the striking face 3 is relatively short, an initial velocity of the golf ball 2 corresponds to a collision velocity. This collision velocity corresponds to a head speed of a club head in an actual golf swing. In view of this point, the collision velocity of the golf ball 2 to the striking face 3 may fall within the range of about 10 m/s to 50 m/s. In the present invention, in light of the head speed of approach shots, the initial velocity is set to 19 m/s.

The desired value of the initial velocity of the golf ball 2 is set by the volume of a controller 6. Based on a distance between a first sensor S1 and a second sensor S2 which are provided in the launcher 5 and a time difference between passing these sensors, the controller 6 calculates the actually measured value of the initial velocity of the golf ball 2, and outputs the value to a computer device PC.

FIG. 4 shows a partially enlarged cross-sectional view of the collisional plate 4. The collisional plate 4 can incline the striking face 3 at a predetermined angle $\alpha$ to the launching direction (flying direction) of the golf ball 2. In the present invention, an angle $\theta$ that is obtained by subtracting the angle $\alpha$ from 90 degree is defined as a collisional angle. This collisional angle $\theta$ corresponds to a loft angle of a club face (not shown) in an actual swing. Further, in consideration of the loft angle of a golf club, the collisional angle can be set to more than one value (for example, 15°, 20°, 35°) in the range from 10° to 90°, and the measurement of the contact force, which will be described later, can be conducted at each angle. In the present invention, the collisional angle $\theta$ is made 55° in order to recreate the spin rate on approach shots.

The collisional plate 4 has a base plate 4a formed of a metal plate material, a superficial plate 4c with the striking face 3, and a pressure sensor 4b interposed therebetween, and they are fixed to one another with a bolt 4d integrally.

The base plate 4a may be formed of any material without particular limitation, as long as it has a predetermined strength and rigidity, but preferably formed of steel. The base plate 4a preferably has a thickness in a range from 5.0 mm to 20.0 mm. A model number of the main bolt 4d is, for example, M10 according to Japanese Industrial Standards (JIS).

As the pressure sensor 4b, for example, a 3-component force sensor is preferably used. The sensor 4b measures, at least, a perpendicular force Fn in a direction perpendicular to the striking face 3, and a shear force Ft in a direction parallel to the striking face 3 (the direction of the sole side toward the crown side in a club face) as time-series data. The measurement of the force is conducted by connecting a charge amplifier to the pressure sensor 4b.

As the pressure sensor 4b, a variety of products may be used, for example, a 3-component force sensor (model 9067) manufactured by Kistler Instrument Corp is preferably used. This sensor enables to measure force components in a parallel direction, a Y direction and a perpendicular direction. Although not illustrated, the measurement of the pressure is conducted with a charge amplifier (model 5011B of Kistler Instrument Corp.) connected to the pressure sensor 4b. The pressure sensor 4b is formed in its center with a through-hole through which the main bolt 4d is inserted to integrally fix the pressure sensor 4b with the base plate 4a.

The superficial plate 4c is composed of the main body 4c1 and a superficial material 4c2 which is disposed outside of the main body 4c1 to provide the striking face 3 and has an area which is large enough to collide with the golf ball 2. These are firmly fixed with a bolt which is not illustrated in a detachable manner. Accordingly, by appropriately changing the material, planner shape and/or surface structure of the superficial material 4c2, it is possible to create approximate models of various kinds of club faces and to measure the contact force thereof.

The main body 4c1 may be formed of any materials without limitation, but typically of stainless steel (SUS-630). The thickness of the main body 4c1 is typically in the range from 10 mm to 20 mm. Also, the main body 4c1 may have a planner shape which is substantially the same with that of the pressure sensor 4b, such as a square 40 mm to 60 mm on a side. Into the main body 4c1, one end of the main bolt 4d is screwed. As a result, the pressure sensor 4b is interposed between the base plate 4a and the main body 4c1, and the position thereof is fixed.

As to the superficial material 4c2 which provides the striking face 3 of the collisional plate 4, various materials, planner shapes and surface structures may be adopted, however, the superficial material 4c2 is preferably formed of the same material as the face (not shown) of the golf club head which is subject to an analysis. In the present invention, in view of evaluation of model of approach shots, stainless SUS-431 which is the same material as the head material of CG-15 manufactured by Cleveland Golf is used as the superficial material 4c2. The thickness of the superficial material 4c2 may be arbitrarily changed, for example, within the range of 1.0 mm to 5.0 mm. The planner shape of the superficial material 4c2 is substantially the same with that of the main body 4c1, for example, a square 40 mm to 60 mm on a side.

The contact force tester 1 includes a strobe device 7 and a high speed type camera device 8 which can take a photograph of the collision between the golf ball 2 and the striking face 3 and the golf ball 2 that rebounds from the striking face 3. The strobe device 7 is connected to a strobe power 9. The camera device 8 is connected to a camera power 10 via a capacitor box. The imaged data is memorized in the computer device PC. By including these devices, a slipping velocity at the time of the collision between the golf ball 2 and the striking face 3 which will be explained later, a contact area, and an initial launch speed, a flying angle (launch angle) and a backspin rate of a golf ball can be measured.

Figure 5:
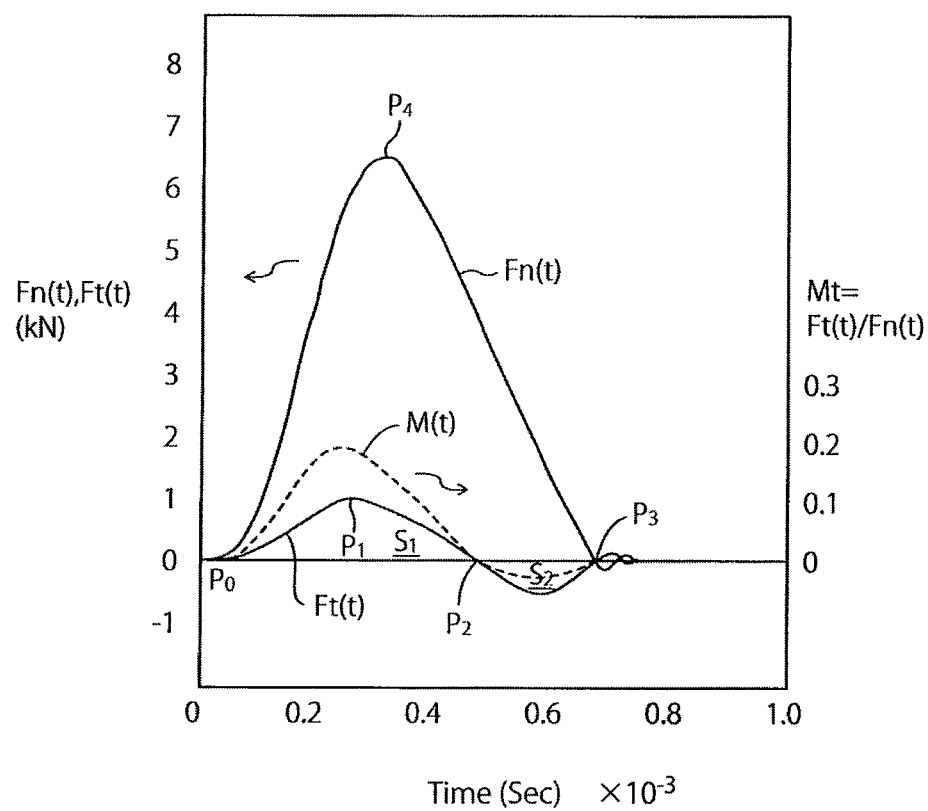
FIG. 5 is a graph illustrating Ft(t), Fn(t), and M(t)

FIG. 5 shows the time history of the perpendicular force Fn and the shear force Ft applied to the striking face 3 at the time of the collision with the golf ball 2 measured by the contact force tester 1.

FIG. 5 is a graph illustrating an example of Fn(t) and Ft(t) measured by the tester shown in FIGS. 3 and 4. In FIG. 5, a point P0 represents a position where the pressure sensor 4b starts sensing force, and generally corresponds to the point at which the collisional plate 3 and the golf ball 2 come into collision with each other. Fn(t) which is a perpendicular component of the contact force gradually increases from the point P0, peaks at a point P4, comes down therefrom to reach zero at a point P3. The point P3 represents a point where the pressure sensor 4b no longer senses force, and generally corresponds to the point where the golf ball 2 leaves the collisional plate 3.

On the other hand, a value of Ft(t) which is a parallel component of the contact force to the collisional plate (i.e., shear strength) increases with time from the point P0, peaks at the point P1, then gradually decreases to zero at the point P2 after which it takes a negative value. Since the golf ball leaves the pressure sensor 4b at the point P3, the curve of Ft(t) sensed by the pressure sensor 4b takes zero at the point P3. An area S1 of the region where Ft(t) takes positive values within the area surrounded by the curve of Ft(t) and the time axis represents impulse where shear strength is positive. On the other hand, an area S2 of the region where Ft(t) takes negative values within the area surrounded by the curve of Ft(t) and the time axis represents impulse where the shear strength is negative. Impulse S1 acts in such a direction that promotes back spin. Here, impulse S1 takes a large value than impulse S2, and a value obtained by subtracting impulse S2 from impulse S1 contributes to back spin of a golf ball.

A coefficient of friction can be obtained by calculating a maximum value of M(t) which is expressed by Ft(t)/Fn(t).

In the present invention, the coefficient of friction is preferably 0.35 or more, more preferably 0.37 or more, even more preferably 0.39 or more, and is preferably 0.60 or less, more preferably 0.56 or less, even more preferably 0.54 or less. If the coefficient of friction is within the above range, a spin rate on approach shots becomes good.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Slab Hardness (Shore D Hardness)

Sheets with a thickness of about 2 mm were produced by injection molding the intermediate layer composition and cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(2) Measurement of Coefficient of Friction

A coefficient of friction of golf balls was measured using a contact force tester 1 shown in FIGS. 3 and 4.

1. Specification of Measuring Apparatus
   (A) Launcher: air gun system
   (B) Collisional plate:
base plate 4a
   Steel
   Thickness: 5.35 mm
Superficial plate 4c
   Main body 4c1
   Size: 56 mm×56 mm×15 mm
   Stainless steel (SUS-630)
   Superficial material 4c2
   Size: 56 mm×56 mm×2.5 mm
   Metal composition: SUS-431
   Groove structure: see FIG. 6
Angle of inclination ($\alpha$)
   35 degrees (with respect to flying direction of golf ball)
   (C) Pressure sensor 4b
   A 3-component force sensor (model 9607) available from Kistler Instrument Corp.
Charge Amplifier
   Model 5011B available from Kistler Instrument Corp.
   (D) Capture of contact force into PC
   A pulse counter board PCI-6101 (manufactured by INTERFACE CORPORATION) was used. With a 16-bit PCI pulse counter board having 4 channels, measurement suited for a specific application may be realized in four counter modes. The maximum input frequency is 1 MHz.

Figure 6:
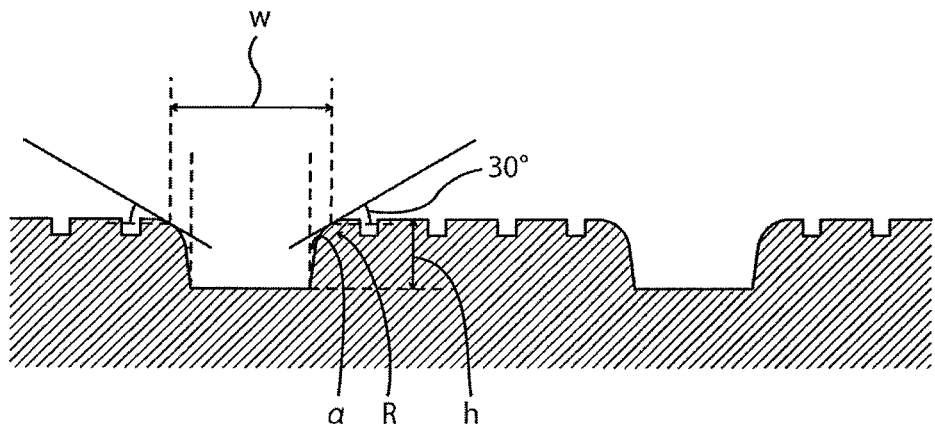
FIG. 6 is a cutaway view of a groove shape of a superficial material of the contact force tester.
Figure 6:
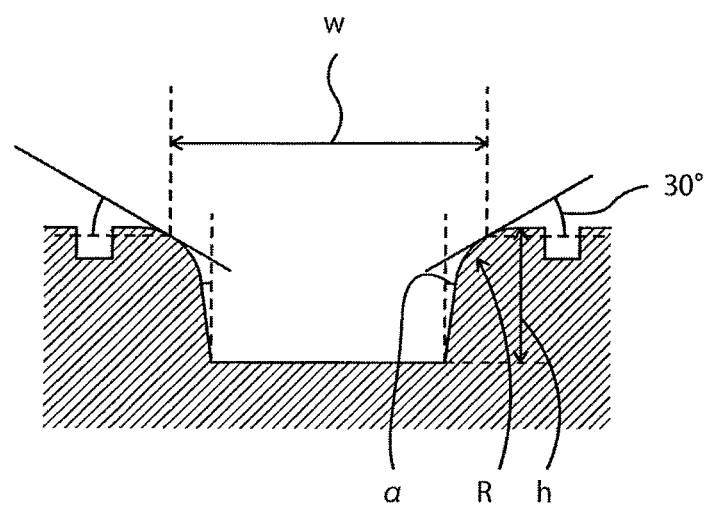

As shown in FIG. 6, the groove structure of a sand wedge CG-15 available from Cleveland Golf is reproduced on the striking face 3 of the collisional plate 4. As shown in FIG. 6 (a), on the striking face 3, large grooves (zip grooves) are formed, and a plurality of small grooves are formed on the surface between the large grooves (zip grooves). FIG. 6 (b) is an enlarged view of cross-section structure of the zip grooves. The dimensions of the zip grooves are as follows.
   Zip groove (groove) width W: 0.70 mm
   Zip groove (groove) depth h: 0.50 mm
   Zip groove (groove) pitch: 3.56 mm
   Zip groove (groove) angle $\alpha$: 10°
   Zip groove shoulder R: 0.25

A plurality of small grooves between Zip grooves are formed by a laser-milling method so that the surface portion between Zip grooves have surface roughness Ra=2.40±0.8 μm and Rmax=14.0±8 μm. It is noted that the surface roughness Ra and Rmax can be measured with SJ-301 manufacture by Mitsutoyo Corporation under the conditions of the specimen length=2.5 mm and cut off value=2.5 mm.

2. Measuring Procedure

Measurement of a coefficient of friction was conducted in the following manner.
 (a) Set the angle (α) of the collisional plate at 35 degrees to the flying direction (vertical direction) of the golf ball.
 (b) Adjust air pressure of the launcher 5.
 (c) Launch the golf ball from the launcher.
 (d) Measure the initial velocity of the golf ball from the preset distance between the sensor 1 and sensor 2 and the time difference between the times for the golf ball to interrupt the sensors 1 and 2. The initial velocity of the golf ball was set to 19 m/s.
 (e) Measure the contact force Fn(t) and contact force Ft(t), and calculate maximum value of Ft(t)/Fn(t).

3. Result of Measurement

Figure 7:
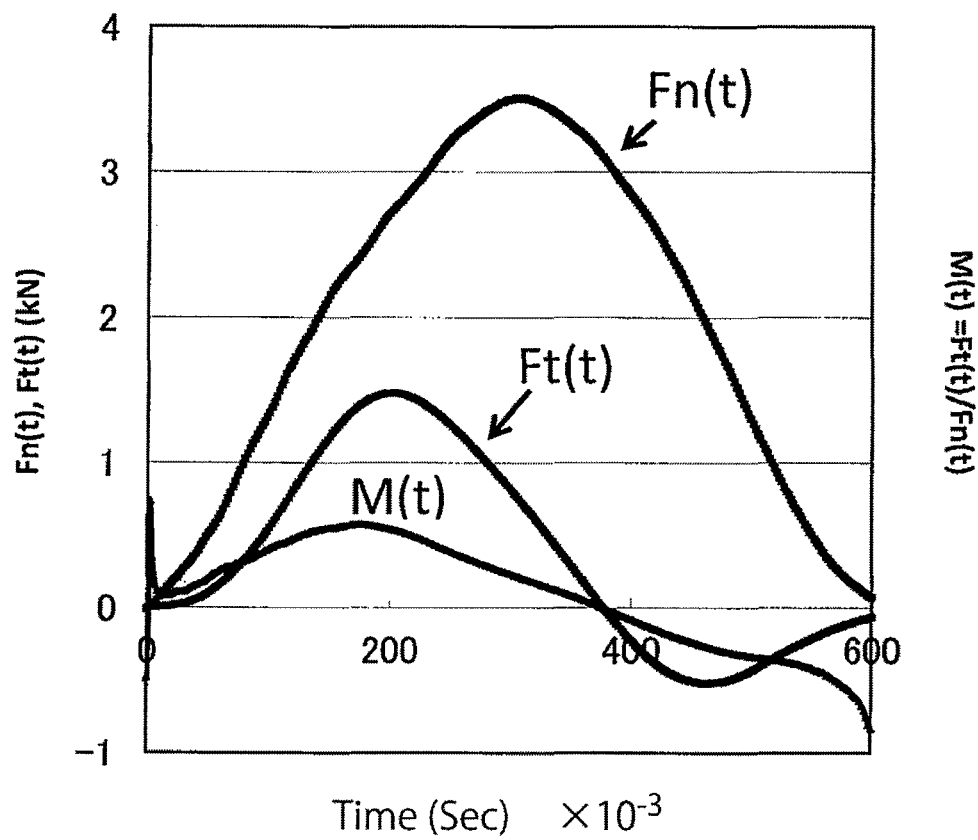
FIG. 7 is a graph illustrating Ft(t), Fn(t), and M(t)

An example of the results obtained with the tester in the above measuring procedure is shown in FIG. 7. From FIG. 7, a value of M(t) was calculated as Ft(t)/Fn(t), a maximum value was 0.58. Since noises tends to generate in initial period where contact force rises up and terminal period for measuring Ft and Fn, a maximum value of M(t) is calculated after trimming an early stage of the initial period and late stage of the terminal period.

(3) Martens Hardness of the Paint Film

The martens hardness was measured using Nano indenter "ENT-2100" available from ELIONIX. INC. The measuring conditions are as follows.

Load F: 20 mgf
Angle α of Berkovich indenter: 65.03°
Material of Berkovich indenter: $SiO_2$ Based on the depth (h) of indentation and angle (α) of indenter, an area As(h) can be calculated by the following expression.

$$As(h) = 3 \times 3^{1/2} \times \tan \alpha / \cos \alpha \times h^2$$

Based on the load F and area As(h), the martens hardness can be calculated by the following expression.

$$\text{Martens Hardness} = F/As(h)$$

Measuring Sample: The base material and curing agent were blended to prepare a paint. The paint was dried and cured at 40° C. for 4 hours to prepare a paint film having a thickness of 100 μm. This paint film was used for the measurement of the martens hardness.

(4) Mechanical Properties of the Paint Film

The base material and curing agent were blended to prepare a paint. The paint was dried and cured at 40° C. for 4 hours to prepare a paint film. This paint film was punched out in a dumbbell shape to prepare test pieces. The mechanical properties of the paint film were measured using a tensile tester manufactured by SHIMAZU CORPORATION. The elastic modulus at 10% elongation was calculated.

Thickness of Test piece: 0.05 mm
Crosshead Speed: 50 mm/min.

(5) Measurement of a Dynamic Viscoelasticity

The storage modulus E' ($dyn/cm^2$) and the loss tangent (tan δ) of the paint film were measured at the following conditions.
Apparatus: Viscoelasticity measuring apparatus Rheogel-E4000 available from UBM CO., Ltd.

Test piece: The base material and curing agent were blended to prepare a paint. The paint was dried and cured at 40° C. for 4 hours to prepare paint films having a thickness ranging from 0.11 mm to 0.14 mm. These paint films were punched out to prepare test pieces having a width of 4 mm and a distance between the clamps of 20 mm.

Measuring mode: tensile mode
Measuring temp.: from −50° C. to 150° C.
Temperature increase rate: 4° C./min
Measuring date capturing interval: 4° C.
Oscillation frequency: 10 Hz
Measuring strain: 0.1%

For the storage modulus $E'_{120}$ at the temperature of 120° C., employed is the value of the storage modulus which is firstly measured at the measurement temperature of 120° C. or more when elevating the temperature at the temperature increase rate of 4° C. For the storage modulus $E'_{150}$ at the temperature of 150° C., employed is the value of the storage modulus which is firstly measured at the measurement temperature of 150° C. or more when elevating the temperature at the temperature increase rate of 4° C. For the loss tangent tan δ at the temperature of 10° C., employed is the value of the loss tangent which is firstly measured at the measurement temperature of 10° C. or more when elevating the temperature at the temperature increase rate of 4° C.

(6) Compression Deformation Amount (mm)

A compression deformation amount of the core or golf ball (a shrinking amount of the core or golf ball in the compression direction thereof), when applying a load from an initial load of 98N to a final load of 1275N to the core or golf ball, was measured.

(7) Spin Rate on Approach Shots (Head Speed: 21 m/s, 40-Yard to 100-Yard Approach Shots)

A sand wedge (CG15 forged wedge (52°), available from Cleveland Golf) was installed on a swing robot M/C manufactured by TRUETEMPER Sports, Inc. A golf ball was hit at a head speed of 21 m/sec, and a sequence of photographs of the hit golf balls were taken for measuring the spin rate (rpm). The measurement was conducted ten times for each golf ball, and the average value is adopted as the spin rate (rpm). With respect to golf balls No. 22 to 39, the spin rates are shown as the difference from that of golf ball No. 32. With respect to golf balls No. 56 to 79, the spin rates are shown as the difference from that of golf ball No. 68.

(8) Spin Rate on Approach Shots (Head Speed: 10 m/s, Approach Shots Less than 40 Yards)

A sand wedge (CG15 forged wedge (52°), available from Cleveland Golf) was installed on a swing robot M/C manufactured by TRUETEMPER Sports, Inc. A golf ball was hit at a head speed of 10 m/sec, and a sequence of photographs of the hit golf balls were taken for measuring the spin rate (rpm). The measurement was conducted ten times for each golf ball, and the average value is adopted as the spin rate (rpm). The launch angle was determined by measuring the shade of the golf ball with a one-dimensional CCD sensor when the golf ball passes the screen of light emitted from the linear laser source. The screen of light is formed in front of the swing robot along the flight direction of the golf ball. With respect to golf balls No. 22 to 39, the spin rates and launch angles are shown as the difference from those of golf ball No. 32. With respect to golf balls No. 40 to 55, the spin rates and launch angles are shown as the difference from those of golf ball No. 47. With respect to golf balls No. 56 to 79, the spin rates and launch angles are shown as the difference from those of golf ball No. 68. With respect to golf balls No. 80 to 100, the spin rates and launch angles are shown as the difference from those of golf ball No. 86.

(9) Spin Rate (Rpm) on a Driver Shot

A titanium-head driver ("XXIO" manufactured by Dunlop sports, Shaft hardness: S, loft angle: 10°) was installed on a swing robot M/C manufactured by TRUETEMPER Sports, Inc. A golf ball was hit at a head speed of 45 m/sec, and the spin rate immediately after hitting the golf ball was measured. This measurement was conducted ten times for each golf ball, and the average value was adopted as the measurement value for the golf ball. A sequence of photographs of the hit golf ball were taken for measuring the spin rate (rpm) immediately after hitting the golf ball. With respect to golf balls No. 40 to 55, the spin rates are shown as the difference from that of golf ball No. 47. With respect to golf balls No. 80 to 100, the spin rates are shown as the difference from that of golf ball No. 86.

(10) Flight Distance (m) on a Driver Shot

A metal-head driver ("XXIO" manufactured by Dunlop sports, Shaft hardness: S, loft angle: 11°) was installed on a swing robot M/C manufactured by TRUETEMPER Sports, Inc. A golf ball was hit at a head speed of 40 m/sec, and the flight distance (the distance from the launch point to the stop point) was measured. This measurement was conducted twelve times for each golf ball, and the average value was adopted as the measurement value for the golf ball.

(11) Shot Feeling

An actual hitting test was carried out by ten amateur golfers (high skilled person) using a sand wedge (CG 15 forged wedge (52°) available from Cleveland Golf). In accordance with the number who answered the shot feeling was good (feeling like that the golf ball was lifted on the club face, feeling like that the golf ball gripped on the club surface, feeling like that the spin is imparted, feeling like that the golf ball was stuck on the club face, etc.), the golf balls were evaluated as follows.

E (Excellent): 9 or more
G (Good): 6 to 8
F (Fair): 3 to 5
P (Poor): 2 or less

It should be noted that the golf balls No. 56 to No. 100 were evaluated according to the following criteria.

G (Good): 8 or more
F (Fair): 4 to 7
P (Poor): 3 or less

[Production of the Golf Balls]

(1) Preparation of Center Rubber Composition

The blending materials shown in Tables 1 and 2 were kneaded to prepare the center rubber compositions.

TABLE 1

| | | Center Rubber composition No. | | | | | | | | | |
|---|---|---|---|---|---|---|---|---|---|---|---|
| | | a | b | d | d | e | f | g | h | i | j |
| Formulation (parts by mass) | Polybutadiene rubber | 100 | — | 100 | 100 | 100 | 100 | 100 | 100 | 100 | 100 |
| | ZN-DA90S | 45 | — | 43 | 41 | 38 | 35 | 30 | 26 | 20 | 18 |
| | Sanceler SR | — | — | — | — | — | — | — | — | — | — |
| | Zinc oxide | 5 | — | 5 | 5 | 5 | 5 | 5 | 5 | 5 | 5 |
| | Barium sulfate | *1) | — | *1) | *1) | *1) | *1) | *1) | *1) | *1) | *1) |
| | Diphenyldisulfide | 0.5 | — | 0.5 | 0.5 | 0.5 | 0.5 | 0.5 | 0.5 | 0.5 | 0.5 |
| | 2-Thionaphthol | — | — | — | — | — | — | — | — | — | — |
| | Bis(pentabromophenyl)disulfide | — | — | — | — | — | — | — | — | — | — |
| | Zinc octanoate | — | — | — | — | — | — | — | — | — | — |
| | Dicumyl peroxide | 0.8 | — | 0.8 | 0.8 | 0.8 | 0.8 | 0.8 | 0.8 | 0.8 | 0.8 |
| | Nucrel AN4319 | — | 100 | — | — | — | — | — | — | — | — |
| | Basic Mg oleate | — | 41 | — | — | — | — | — | — | — | — |
| | Oleic acid | — | 28 | — | — | — | — | — | — | — | — |

*1) Barium sulfate: adjustment was made such that the golf ball had a mass of 45.3 g.
*2) Barium sulfate: adjustment was made such that the golf ball had a mass of 45.6 g.
*3) Barium sulfate: adjustment was made such that the golf ball had a mass of 45.4 g.

TABLE 2

| | | Center Rubber composition No. | | | | | | | | | |
|---|---|---|---|---|---|---|---|---|---|---|---|
| | | k | l | m | n | o | p | q | r | s | t |
| Formulation (parts by mass) | Polybutadiene rubber | 100 | 100 | 100 | 100 | 100 | 100 | 100 | 100 | 100 | 100 |
| | ZN-DA90S | — | — | — | — | 35 | — | — | — | — | — |
| | Sanceler SR | 45 | 23 | 40 | 25 | — | 39 | 39 | 35 | 35 | 23 |
| | Zinc oxide | 5 | 5 | 5 | 5 | 5 | 5 | 5 | 5 | 5 | 5 |
| | Barium sulfate | *2) | *3) | *3) | *3) | *1) | *1) | *2) | *1) | *3) | *1) |
| | Diphenyldisulfide | — | — | — | — | 0.5 | — | — | — | — | — |
| | 2-Thionaphthol | 0.32 | — | 0.2 | 0.2 | — | 0.32 | 0.32 | 0.2 | 0.2 | — |
| | Bis(pentabromophenyl)disulfide | — | 0.3 | — | — | — | — | — | — | — | 0.3 |
| | Zinc octanoate | 5.0 | — | 5.0 | 5.0 | — | 5.0 | 5.0 | 5.0 | 5.0 | — |
| | Dicumyl peroxide | 0.8 | 0.8 | 0.8 | 0.75 | 0.9 | 0.8 | 0.8 | 0.8 | 0.8 | 0.8 |
| | Nucrel AN4319 | — | — | — | — | — | — | — | — | — | — |
| | Basic Mg oleate | — | — | — | — | — | — | — | — | — | — |
| | Oleic acid | — | — | — | — | — | — | — | — | — | — |

*1) Barium sulfate: adjustment was made such that the golf ball had a mass of 45.3 g.
*2) Barium sulfate: adjustment was made such that the golf ball had a mass of 45.6 g.
*3) Barium sulfate: adjustment was made such that the golf ball had a mass of 45.4 g.
Polybutadiene rubber: "BR730 (high cis-polybutadiene)" manufactured by JSR Corporation
Sanceler SR: zinc acrylate (product of 10 mass % stearic acid coating) available from Sanshin Chemical Industry Co., Ltd.

TABLE 2-continued

| | Center Rubber composition No. | | | | | | | | | |
|---|---|---|---|---|---|---|---|---|---|---|
| | k | l | m | n | o | p | q | r | s | t |

Zinc oxide: "Ginrei R" manufactured by Toho-Zinc Co.
Barium sulfate: "Barium Sulfate BD" manufactured by Sakai Chemical Industry Co., Ltd.
Diphenyl disulfide: manufactured by Sumitomo Seika Chemicals Company Limited 2-thionaphthol: manufactured by Tokyo Chemical Industry Co., Ltd.
Bis(pentabromophenyl)disulfide: manufactured by Kawaguchi Chemical Industry Co., Ltd.
Zinc octanoate: manufactured by Mitsuwa Chemicals Co., Ltd.
Dicumyl peroxide: "Percumyl D" manufactured by NOF Corporation
Nucrel AN4319: Ethylene-methacrylic acid-butyl acrylate copolymer available from Du Pont-Mitsui Polychemicals Co., Ltd.
Basic magnesium oleate: Nitto kasei Kougyo Co., Ltd.
Oleic acid: Wako Pure Chemical Industries, Ltd.

(2) Preparation of the Intermediate Layer Composition and Cover Composition

The materials shown in Tables 3 and 4 were mixed using a twin-screw kneading extruder to obtain the intermediate layer composition and cover composition in the form of pellet. The extrusion was conducted in the following conditions: screw diameter=45 mm, screw revolutions=200 rpm, and screw L/D=35. The blended materials were heated to from 200° C. to 260° C. at the die position of the extruder.

TABLE 3

| | | Intermediate layer composition No. | | | | | | |
|---|---|---|---|---|---|---|---|---|
| | | A | B | C | D | E | F | G |
| Formulation (parts by mass) | Surlyn 8945 | 55 | 55 | — | — | — | — | 50 |
| | Himilan AM7329 | 45 | 45 | — | 40 | 40 | 40 | 50 |
| | Himilan AM7337 | — | — | — | 40 | 45 | 51 | — |
| | Elastollan XNY97A | — | — | 100 | — | — | — | — |
| | Rabalon T3221C | — | — | — | 20 | 15 | 9 | — |
| | Tinuvin 770 | — | — | 0.2 | — | — | — | — |
| | Titanium dioxide | 4 | 3 | 4 | 6 | 6 | 6 | 4 |
| | Ultramarine blue | — | — | 0.04 | — | — | — | — |

Surlyn 8945: Sodium ion neutralized ethylene-methacrylic acid copolymer ionomer resin available from E.I. du Pont de Nemours and Company
Himilan AM7329: Zinc ion neutralized ethylene-methacrylic acid copolymer ionomer resin available from Du Pont-Mitsui Polychemicals Co., Ltd.
Himilan AM7337: Sodium ion neutralized ethylene-methacrylic acid copolymer ionomer resin available from Du Pont-Mitsui Polychemicals Co., Ltd.
Elastollan XNY97A: Thermoplastic polyurethane elastomer manufactured by BASF Japan Ltd.
Rabalon T3221C: Styrene elastomer available from Mitsubishi Chemical Corporation
Tinuvin 770: a hindered amine stabilizer available from BSFA Japan Ltd.

TABLE 4

| | | Cover composition No. | | | | | | | | | | | | | |
|---|---|---|---|---|---|---|---|---|---|---|---|---|---|---|---|
| | | a | b | c | d | e | f | g | h | i | j | k | l | m | n |
| Formulation (parts by mass) | Elastollan XNY 73A | 100 | — | — | — | — | — | — | — | — | — | — | — | — | — |
| | Elastollan XNY 75A | — | 100 | — | — | — | — | — | — | — | — | — | — | — | — |
| | Elastollan XNY 80A | — | — | 100 | — | — | — | — | — | — | — | — | — | — | — |
| | Elastollan XNY 82A | — | — | — | — | — | — | — | — | — | — | 100 | — | — | — |
| | Elastollan XNY 83A | — | — | — | 100 | — | — | — | — | — | — | — | — | — | — |
| | Elastollan XNY 85A | — | — | — | — | 100 | — | — | — | — | — | — | — | — | — |
| | Elastollan XNY 95A | — | — | — | — | — | 100 | — | — | — | — | — | — | — | — |
| | Elastollan XNY 97A | — | — | — | — | — | — | — | — | — | — | — | — | — | 100 |
| | Himilan 1706 | — | — | — | — | — | — | 100 | — | — | — | — | — | — | — |
| | Himilan 1555 | — | — | — | — | — | — | — | — | — | — | — | 10 | — | — |
| | Surlyn 8945 | — | — | — | — | — | — | — | 30 | 15 | 5 | — | — | — | — |
| | Himilan AM7329 | — | — | — | — | — | — | — | 40 | 15 | 10 | — | 55 | — | — |
| | Himilan AM 7337 | — | — | — | — | — | — | — | — | — | — | — | 5 | — | — |
| | Novamid ST 220 | — | — | — | — | — | — | — | 30 | 70 | 85 | — | — | — | — |
| | Nucrel N1050H | — | — | — | — | — | — | — | — | — | — | — | 30 | — | — |
| | Tinuvin 770 | — | — | — | — | — | — | — | — | — | — | 0.2 | 0.2 | — | 0.2 |
| | Titanium dioxide | 4 | 4 | 4 | 4 | 4 | 4 | 4 | 4 | 4 | 4 | 4 | 3 | 3 | 4 |

TABLE 4-continued

| | | Cover composition No. | | | | | | | | | | | | |
|---|---|---|---|---|---|---|---|---|---|---|---|---|---|---|
| | | a | b | c | d | e | f | g | h | i | j | k | l | m | n |
| | Ultramarine blue | 0.08 | 0.08 | 0.08 | 0.08 | 0.08 | 0.08 | 0.08 | 0.08 | 0.08 | 0.08 | 0.04 | — | 0.04 | 0.04 |
| Slab hardness (Shore D) | | 7 | 10 | 20 | 25 | 32 | 50 | 60 | 67 | 73 | 76 | 29 | 61 | 32 | 47 |

Elastollan XNY73A: Thermoplastic polyurethane elastomer manufactured by BASF Japan Ltd.
Elastollan XNY75A: Thermoplastic polyurethane elastomer manufactured by BASF Japan Ltd.
Elastollan XNY80A: Thermoplastic polyurethane elastomer manufactured by BASF Japan Ltd.
Elastollan XNY82A: Thermoplastic polyurethane elastomer manufactured by BASF Japan Ltd.
Elastollan XNY83A: Thermoplastic polyurethane elastomer manufactured by BASF Japan Ltd.
Elastollan XNY85A: Thermoplastic polyurethane elastomer manufactured by BASF Japan Ltd.
Elastollan XNY95A: Thermoplastic polyurethane elastomer manufactured by BASF Japan Ltd.
Elastollan XNY97A: Thermoplastic polyurethane elastomer manufactured by BASF Japan Ltd.
Himilan 1706: Zinc ion neutralized ethylene-methacrylic acid copolymer ionomer resin available from Du Pont-Mitsui Polychemicals Co., Ltd.
Himilan 1555: Sodium ion neutralized ethylene-methacrylic acid copolymer ionomer resin available from Du Pont-Mitsui Polychemicals Co., Ltd.
Surlyn 8945: Sodium ion neutralized ethylene-methacrylic acid copolymer ionomer resin available from E.I. du Pont de Nemours and Company
Himilan AM7329: Zinc ion neutralized ethylene-methacrylic acid copolymer ionomer resin available from Du Pont-Mitsui Polychemicals Co., Ltd.
Himilan AM7337: Sodium ion neutralized ethylene-methacrylic acid copolymer ionomer resin available from Du Pont-Mitsui Polychemicals Co., Ltd.
Novamid ST220: Polyamide resin (High impact resistance grade, flexural modulus: 2000 MPa) available from Mitsubishi Engineering-Plastics Company.
Nucrel N1050H: Ethylene-methacrylic acid copolymer available from Du Pont-Mitsui Polychemicals Co., Ltd.
Tinuvin 770: a hindered amine stabilizer available from BSFA Japan Ltd.

(3) Preparation of Paint

The polyol and the polyisocyanate shown in Tables 5 and 6 were blended to prepare paints. The base material was prepared by using a mixed solvent of methylethylketone, n-butyl acetate, and toluene to have the polyol component content of 30 mass %. The curing agent was prepared by using a mixed solvent of methylethylketone, and toluene as a solvent to have the polyisocyanate component content of 60 mass %. The viscoelasticity of the paints A, B, C, D, and S shown in tables 5 and 6 were measured and the results thereof were shown in FIGS. 9 to 15.

Curing Agent

Isocyanurate of hexamethylene diisocyanate: Duranate TKA-100 (NCO content: 21.7%) available from Asahi Kasei Corporation Biuret-modified product of hexamethylene diisocyanate: Duranate 21S-75E (NCO content: 15.5%) available from Asahi Kasei Corporation Isocyanurate of isophorone diisocyanate: VESTANAT T1890 (NCO content: 12.0%) available from Degussa (4) [Production of Golf Balls]

TABLE 5

| | | | Paint No. | | | | | | | | |
|---|---|---|---|---|---|---|---|---|---|---|---|
| | | | V | A | B | U | B1 | B2 | B3 | B4 | T | B6 |
| Paint Formulation | Curing agent *1) | Biuret-modified HDI/HDI isocyanurate | 30/30 | 30/30 | 30/30 | 30/30 | 45/45 | 40/40 | 25/25 | 15/15 | 5/55 | 20/40 |
| | | IPDI component (IPDI isocyanurate) | 40 | 40 | 40 | 40 | 10 | 20 | 50 | 70 | 40 | 40 |
| | Base resin/curing agent (NCO/OH mole ratio) | | 0.2/1.0 | 0.38/1.0 | 0.5/1.0 | 0.07/1.0 | 0.5/1.0 | 0.5/1.0 | 0.5/1.0 | 0.5/1.0 | 0.5/1.0 | 0.5/1.0 |

*1) Curing agent formulation: mass ratio

TABLE 6

| | | | Paint No. | | | | | | | |
|---|---|---|---|---|---|---|---|---|---|---|
| | | | B7 | B8 | C | CS | S | D | B | CB |
| Paint Formulation | Curing agent *1) | Biuret-modified HDI/HDI isocyanurate | 40/20 | 50/10 | 30/30 | 30/30 | 30/30 | 30/30 | 30/30 | 30/30 |
| | | IPDI component (IPDI isocyanurate) | 40 | 40 | 40 | 40 | 40 | 40 | 40 | 40 |
| | | Base resin/curing agent (NCO/OH mole ratio) | 0.5/1.0 | 0.5/1.0 | 0.8/1.0 | 1.0/1.0 | 1.2/1.0 | 1.6/1.0 | 0.5/1.0 | 0.74/1.0 |

*1) Curing agent formulation: mass ratio

Material used in Tables 5 and 6 are follows.

Base Resin

Polin #950 available from SHINTO PAINT: urethane polyol with a hydroxyl value of 128 mgKOH/g, and composed of the polyol component (trimethylolpropane and polyoxytetramethylene glycol) and the polyisocyanate component (isophorone diisocyanate)

(4-1) Three-Piece Golf Balls No. 1 to 19, 22 to 37, 40 to 53, 56 to 77, 80 to 98, 101 to 120, 123 to 145

In the case of using a rubber composition as the center rubber composition, the rubber compositions were kneaded and pressed in upper and lower molds, each having a hemispherical cavity at a temperature of 170° C. for 20 minutes to prepare spherical centers (cores). In the case of using a resin composition as the center rubber composition, the blending materials were dry blended, followed by mixing with a twin-screw kneading extruder to extrude the blended material in the strand form into the cool water. The extruded strand was cut with a pelletizer to prepare a center composition in the form of pellet. Extrusion was conducted in the following conditions: screw diameter: 45 mm; screw revolutions=200 rpm; and screw L/D=35. The mixtures were heated to a temperature in a range from 160° C. to 230° C. at a die position of the extruder. The obtained center composition in the form of pellet was injection molded at a temperature of 220° C. to prepare spherical centers (cores).

The intermediate layer compositions were injection molded on the spherical centers (cores) to form the intermediate layer enclosing the spherical centers (cores). Upper and lower molds for molding have a spherical cavity and retractable hold pins which support the spherical centers. When molding the intermediate layer, the hold pins were protruded, the centers (cores) were placed in the molds and held with the protruded hold pins, the intermediate layer compositions heated at 260° C. was charged into the molds clamped at a pressure of 80 tons within 0.3 seconds, and cooled for 30 seconds. Then, the molds were opened.

Compression molding of half shells was conducted by, charging one pellet of the cover composition obtained as described above into each of depressed parts of lower molds for molding half shells, and applying pressure to mold half shells. Compression molding was conducted at a temperature of 170° C. for 5 minutes under a molding pressure of 2.94 MPa.

The spherical bodies covered with the intermediate layer obtained above were covered with the two half shells in a concentric manner, and the cover was molded by compression molding. Compression molding was conducted at a temperature of 145° C. for 2 minutes under a molding pressure of 9.8 MPa.

(4-2) Four Piece Golf Balls No. 20, 121, and 146

The center compositions were kneaded and pressed in upper and lower molds, each having a hemispherical cavity at a temperature of 170° C. for 25 minutes to prepare spherical centers (cores). The spherical centers (cores) were placed in the molds, the intermediate layer compositions obtained above were injection molded about the spherical centers (cores) to form the first intermediate layer (thickness: 1.0 mm). The cover compositions were compression-molded into half shells. The half shells were compression-molded into the inner cover (thickness: 0.3 mm) enclosing the first intermediate layer. The cover compositions were compression-molded into half shells. The half shells were compression-molded into the outer cover (thickness: 0.3 mm) enclosing the inner cover.

(4-3) Four Piece Golf Balls No. 38, and 78

The center compositions were kneaded and pressed in upper and lower molds, each having a hemispherical cavity at a temperature of 170° C. for 25 minutes to prepare spherical centers (cores). The spherical centers (cores) were placed in the molds, the intermediate layer compositions obtained above were injection molded about the spherical centers (cores) to form the first intermediate layer (thickness: 1.0 mm). The intermediate layer compositions were compression-molded into half shells. The half shells were compression-molded into the second intermediate layer (thickness: 0.3 mm) enclosing the first intermediate layer. The cover compositions were compression-molded into half shells. The half shells were compression-molded into the cover (thickness: 0.3 mm) enclosing the second intermediate layer.

(4-4) Four Piece Golf Balls No. 54, 55, 99

The center compositions were kneaded and pressed in upper and lower molds, each having a hemispherical cavity at a temperature of 170° C. for 25 minutes to prepare spherical centers (cores) having a diameter of 37.9 mm. The spherical centers (cores) were placed in the molds, the intermediate layer compositions obtained above were injection molded about the spherical centers (cores) to form the first intermediate layer (thickness: 0.8 mm). Further, the intermediate layer compositions obtained above were injection molded about the first intermediate layers to form the second intermediate layer (thickness: 0.8 mm). Finally, the cover composition was injection molded about the second intermediate layer to form the cover (thickness: 0.8 mm).

(4-5) Five Piece Golf Balls No. 21, 39, 79, 122, 147

The center compositions were kneaded and pressed in upper and lower molds, each having a hemispherical cavity at a temperature of 170° C. for 25 minutes to prepare spherical centers having a diameter of 15 mm. In addition, the center compositions were compression molded into half shells. The half shells were compression molded into the enclosing layer (thickness: 12.25 mm) which encloses the spherical center. The spherical cores were placed in the molds, the intermediate layer compositions obtained above were injection molded about the spherical cores to form the first intermediate layer (thickness: 1.0 mm). The cover compositions were compression-molded into half shells. The half shells were compression-molded into the inner cover (thickness: 0.3 mm) enclosing the first intermediate layer. The cover compositions were compression-molded into half shells. The half shells were compression-molded into the outer cover (thickness: 0.3 mm) enclosing the inner cover.

(4-6) Five Piece Golf Ball No. 100

The center composition was kneaded and pressed in upper and lower molds, each having a hemispherical cavity at a temperature of 170° C. for 25 minutes to prepare spherical center (core) having a diameter of 36.3 mm. The spherical center (core) was placed in the molds, the intermediate layer composition obtained above was injection molded about the spherical center (core) to form the first intermediate layer (thickness: 0.8 mm). Further, the intermediate layer composition obtained above was injection molded about the first intermediate layer to form the second intermediate layer (thickness: 0.8 mm). Furthermore, the intermediate layer composition obtained above was injection molded about the second intermediate layer to form the third intermediate layer (thickness: 0.8 mm). Finally, the cover composition was injection molded about the third intermediate layer to form the cover (thickness: 0.8 mm).

Dimples specified in Tables 7 to 9 were formed on the surface of the golf ball bodies No. 101 to 147.

TABLE 7

| Dimple pattern | Kinds | Number | Diameter Dm (mm) | Depth Dp (mm) | Curvature CR (mm) | Volume (mm$^3$) | Number of dimples | Occupation ratio (%) |
| --- | --- | --- | --- | --- | --- | --- | --- | --- |
| D1 | A | 132 | 3.907 | 0.1700 | 11.31 | 1.022 | 312 | 57 |
|  | B | 60 | 3.775 | 0.1730 | 10.38 | 0.971 |  |  |
|  | C | 60 | 3.456 | 0.1730 | 8.72 | 0.814 |  |  |

TABLE 7-continued

| Dimple pattern | Kinds | Number | Diameter Dm (mm) | Depth Dp (mm) | Curvature CR (mm) | Volume (mm³) | Number of dimples | Occupation ratio (%) |
|---|---|---|---|---|---|---|---|---|
|  | D | 60 | 3.099 | 0.1718 | 7.07 | 0.651 |  |  |
|  | E | — | — | — | — | — |  |  |
|  | F | — | — | — | — | — |  |  |
|  | G | — | — | — | — | — |  |  |
|  | H | — | — | — | — | — |  |  |
| D2 | A | 102 | 3.615 | 0.1452 | 11.32 | 0.747 | 432 | 63 |
|  | B | 120 | 3.165 | 0.1608 | 7.87 | 0.635 |  |  |
|  | C | 30 | 3.009 | 0.1567 | 7.30 | 0.559 |  |  |
|  | D | 40 | 2.857 | 0.1557 | 6.63 | 0.501 |  |  |
|  | E | 30 | 3.644 | 0.1551 | 10.78 | 0.811 |  |  |
|  | F | 60 | 3.187 | 0.1702 | 7.54 | 0.681 |  |  |
|  | G | 30 | 3.077 | 0.1720 | 6.97 | 0.642 |  |  |
|  | H | 20 | 2.891 | 0.1601 | 6.61 | 0.528 |  |  |
| D3 | A | 84 | 3.950 | 0.1700 | 11.56 | 1.044 | 342 | 68 |
|  | B | 60 | 3.950 | 0.1570 | 12.50 | 0.964 |  |  |
|  | C | 96 | 3.700 | 0.1700 | 10.15 | 0.917 |  |  |
|  | D | 102 | 3.700 | 0.1570 | 10.98 | 0.846 |  |  |
|  | E | — | — | — | — | — |  |  |
|  | F | — | — | — | — | — |  |  |
|  | G | — | — | — | — | — |  |  |
|  | H | — | — | — | — | — |  |  |

TABLE 8

| Dimple pattern | Kinds | Number | Diameter Dm (mm) | Depth Dp (mm) | Curvature CR (mm) | Volume (mm³) | Number of dimples | Occupation ratio (%) |
|---|---|---|---|---|---|---|---|---|
| D4 | A | 66 | 4.000 | 0.163 | 12.35 | 1.026 | 432 | 73 |
|  | B | 78 | 4.000 | 0.144 | 13.96 | 0.906 |  |  |
|  | C | 48 | 3.650 | 0.162 | 10.36 | 0.850 |  |  |
|  | D | 48 | 3.650 | 0.143 | 11.72 | 0.750 |  |  |
|  | E | 24 | 3.250 | 0.161 | 8.28 | 0.670 |  |  |
|  | F | 24 | 3.250 | 0.142 | 9.37 | 0.590 |  |  |
|  | G | 72 | 2.950 | 0.161 | 6.84 | 0.552 |  |  |
|  | H | 72 | 2.950 | 0.142 | 7.73 | 0.487 |  |  |
| D5 | A | 88 | 4.050 | 0.151 | 13.65 | 0.974 | 408 | 80 |
|  | B | 128 | 4.050 | 0.132 | 15.60 | 0.851 |  |  |
|  | C | 16 | 3.900 | 0.154 | 12.42 | 0.922 |  |  |
|  | D | 32 | 3.900 | 0.134 | 14.26 | 0.802 |  |  |
|  | E | 64 | 3.500 | 0.147 | 10.49 | 0.709 |  |  |
|  | F | 32 | 3.500 | 0.128 | 12.03 | 0.617 |  |  |
|  | G | 16 | 2.800 | 0.152 | 6.52 | 0.470 |  |  |
|  | H | 32 | 2.800 | 0.133 | 7.43 | 0.411 |  |  |
| D6 | A | 16 | 4.600 | 0.1350 | 19.66 | 1.123 | 344 | 85 |
|  | B | 30 | 4.500 | 0.1350 | 18.82 | 1.075 |  |  |
|  | C | 30 | 4.400 | 0.1350 | 17.99 | 1.028 |  |  |
|  | D | 150 | 4.300 | 0.1350 | 17.19 | 0.982 |  |  |
|  | E | 30 | 4.200 | 0.1350 | 16.40 | 0.936 |  |  |
|  | F | 66 | 4.100 | 0.1350 | 15.63 | 0.892 |  |  |
|  | G | 10 | 3.800 | 0.1350 | 13.44 | 0.767 |  |  |
|  | H | 12 | 3.400 | 0.1350 | 10.77 | 0.614 |  |  |

TABLE 9

Figure 9:
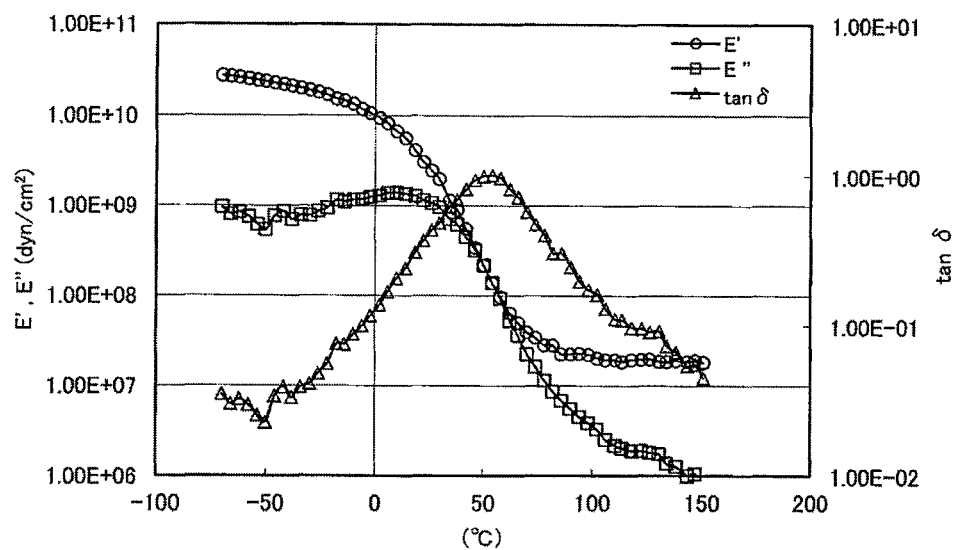
FIG. 9 is a graph showing the viscoelasticity of the paint film A.
Figure 10:
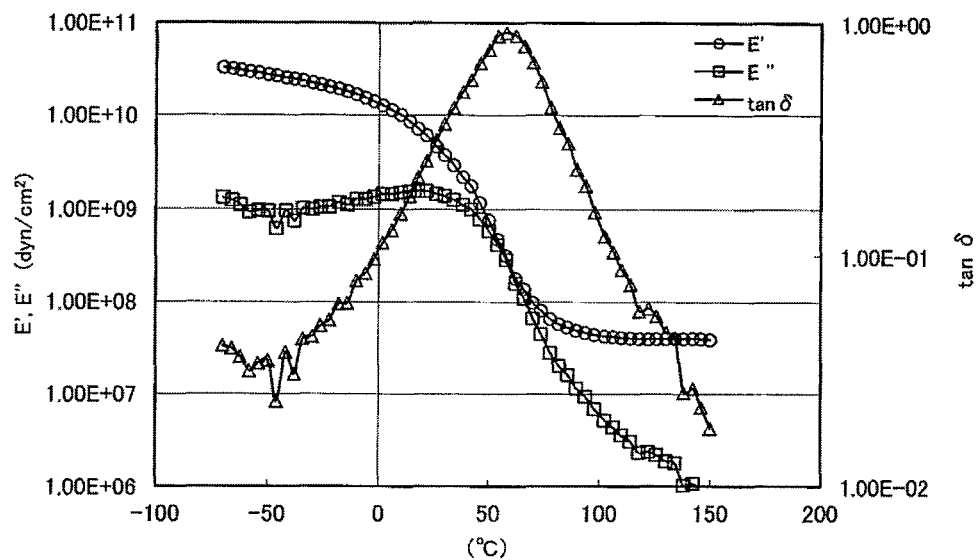
FIG. 10 is a graph showing the viscoelasticity of the paint film B.
Figure 11:
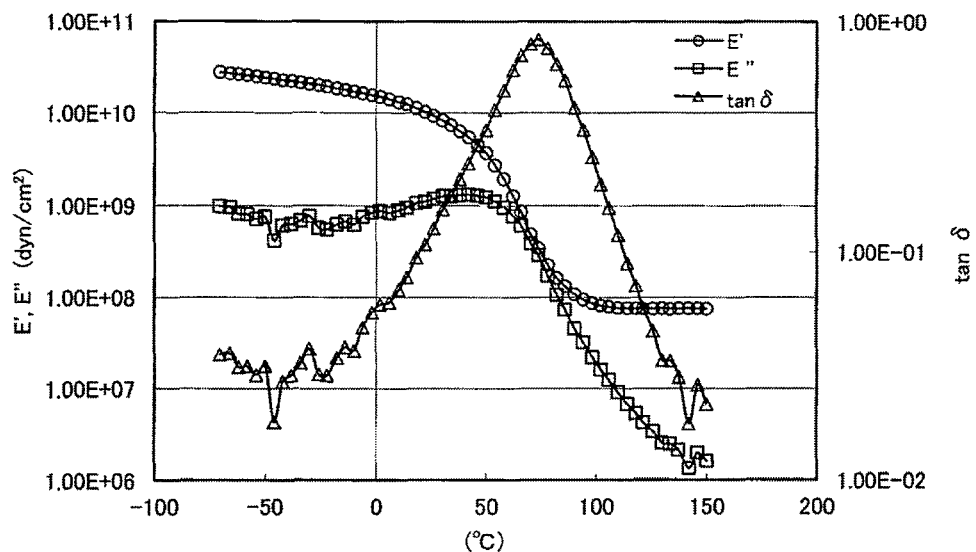
FIG. 11 is a graph showing the viscoelasticity of the paint film C.
Figure 12:
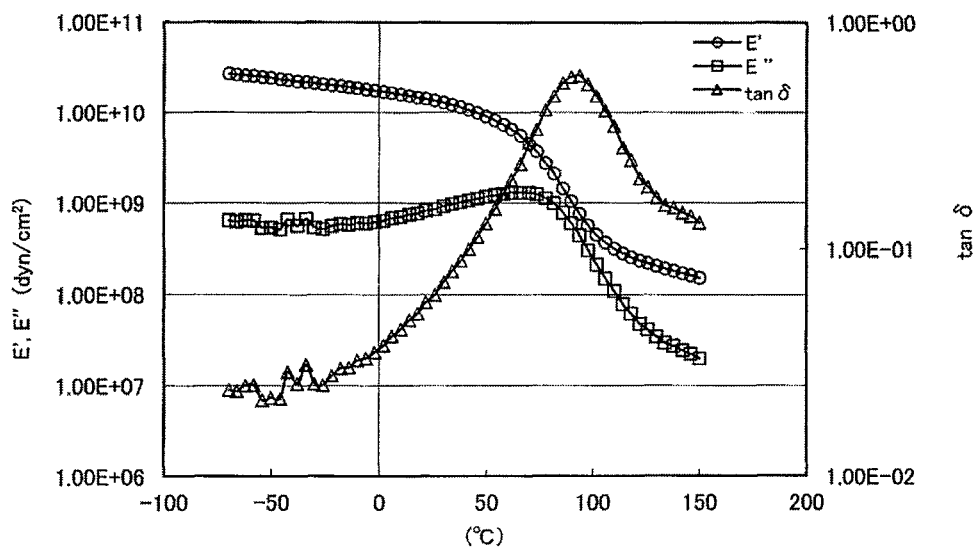
FIG. 12 is a graph showing the viscoelasticity of the paint film D.
Figure 13:
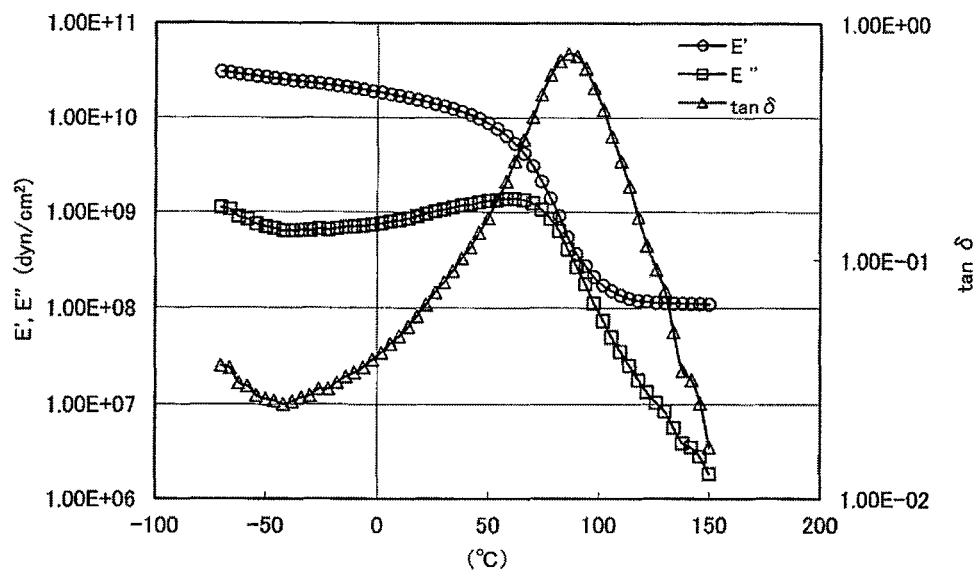
FIG. 13 is a graph showing the viscoelasticity of the paint film S.
Figure 14:
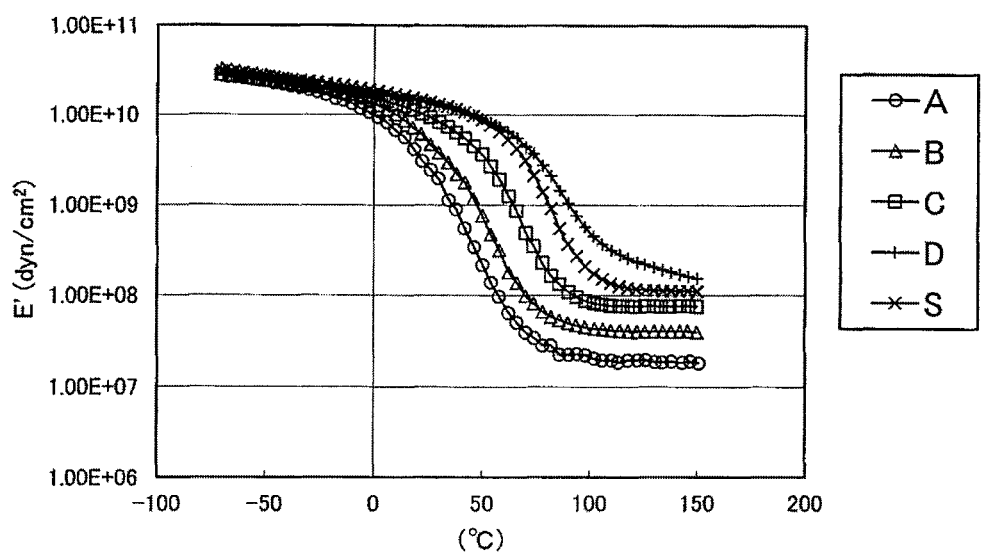
FIG. 14 is a graph comparing the storage moduli of each paint film.
Figure 15:
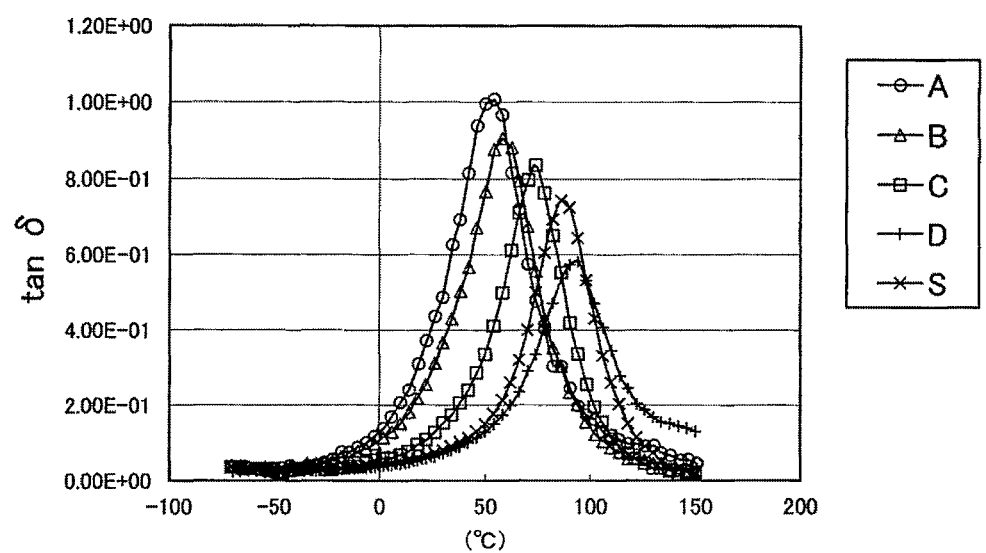
FIG. 15 is a graph comparing the loss tangents of each paint film.

| Dimple pattern | Kinds | Number | Diameter Dm (mm) | Depth Dp (mm) | Curvature CR (mm) | Volume (mm³) | Number of dimples | Occupation ratio (%) |
|---|---|---|---|---|---|---|---|---|
| D7 | A | 78 | 4.100 | 0.142 | 14.87 | 0.939 | 480 | 89 |
|  | B | 108 | 4.100 | 0.114 | 18.49 | 0.753 |  |  |
|  | C | 84 | 3.700 | 0.137 | 12.56 | 0.738 |  |  |
|  | D | 66 | 3.700 | 0.109 | 15.75 | 0.587 |  |  |
|  | E | 18 | 3.200 | 0.144 | 8.96 | 0.581 |  |  |
|  | F | 42 | 3.200 | 0.115 | 11.19 | 0.463 |  |  |
|  | G | 36 | 2.900 | 0.140 | 7.58 | 0.464 |  |  |
|  | H | 48 | 2.900 | 0.112 | 9.44 | 0.371 |  |  |
| D8 |  | Dimple of FIG. 9 in Japanese Patent No. 3478303 |  |  |  |  | — | 99 |

(5) Formation of Paint Film

Figure 8:
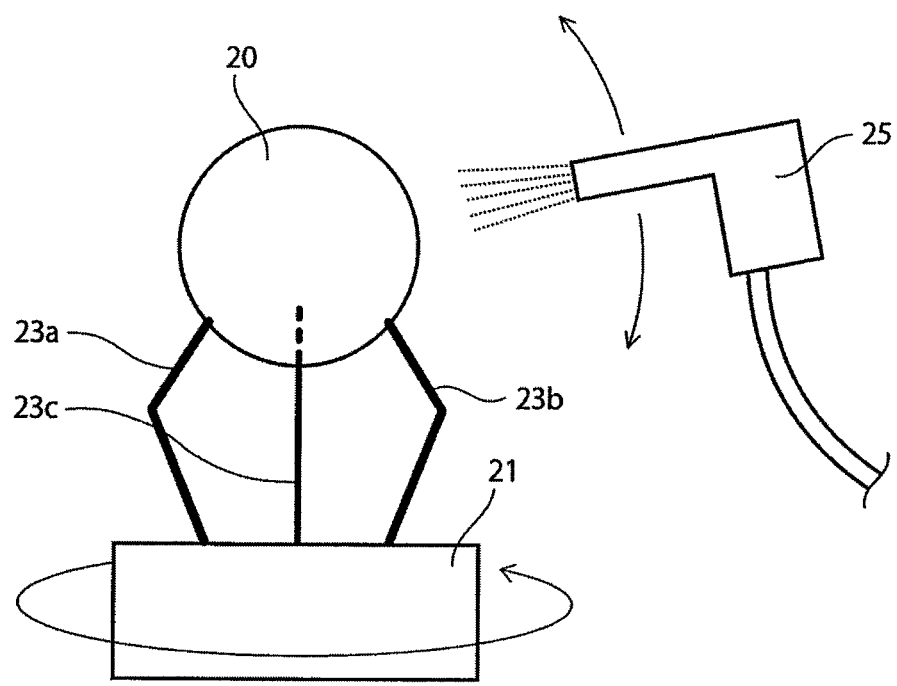
FIG. 8 is a schematic view illustrating an embodiment of applying the paint with an air gun.

The surfaces of the golf ball bodies were subjected to the sandblast treatment, and the marks were formed. Then, the paints were applied to the golf ball bodies with the spray-gun, and the paints were dried in the oven heated at 40° C. for 24 hours to prepare the golf balls having a diameter of 42.7 mm and a mass of 45.3 g to 45.6 g. The thickness of the paint film was 20 μm to 40 μm. The golf ball bodies 20 were placed in the rotating member 21 (23*a* to 23*b*: prong) shown in FIG. 8, which rotated at 300 rpm. The application of the paint was conducted by spacing a spray distance (7 cm) between the air gun 25 and the golf ball body 20 while moving the air gun 25 in a up and down direction. The painting interval in the overpainting operation was set to 1.0 second. Application of the paint was conducted under the spraying conditions of spraying air pressure: 0.15 MPa, compressed air tank pressure: 0.10 MPa, and painting time per one application: 1 second, atmosphere temperature: 20° C. to 27° C., and atmosphere humidity: 65% or less.

The constructions of golf balls No. 1 to 147 are shown in Tables 10 to 15. The results of the evaluation are shown in Tables 16 to 29.

TABLE 10

| | Golf ball body No. | 1-19 | 20 | 21 |
|---|---|---|---|---|
| Golf ball structure (Piece) | | 3 | 4 | 5 |
| Spherical core | Center rubber composition No. | o | p | t |
| | Center diameter (mm) | — | — | 15.0 |
| | Envelope layer rubber composition No. | — | — | r |
| | Spherical core diameter (mm) | 39.3 | 39.5 | 39.5 |
| Intermediate layer | Intermediate layer composition No. | A | B | B |
| | Intermediate layer slab hardness (Shore D) | 65 | 65 | 65 |
| | Intermediate layer thickness (mm) | 1.0 | 1.0 | 1.0 |
| Cover | Inner cover layer composition No. | — | n | n |
| | Inner cover layer slab hardness (Shore D) | — | 47 | 47 |
| | Inner cover layer thickness (mm) | — | 0.3 | 0.3 |
| | Outer cover layer composition No. | m | k | k |
| | Outer cover layer slab hardness (Shore D) | 32 | 29 | 29 |
| | Outer cover layer thickness (mm) | 0.7 | 0.3 | 0.3 |

TABLE 11

| | | Golf ball body No. | | | | | | | |
|---|---|---|---|---|---|---|---|---|---|
| | | 22 | 23 | 24 | 25 | 26-33 | 34 | 35-37 | 38 | 39 |
| Golf ball structure (piece) | | 3 | 3 | 3 | 3 | 3 | 3 | 3 | 4 | 5 |
| Spherical core | Center rubber composition No. | o | o | o | o | o | o | o | q | l |
| | Center diameter (mm) | — | — | — | — | — | — | — | — | 15 |
| | Envelope layer rubber composition No. | — | — | — | — | — | — | — | — | s |
| | Spherical core diameter (mm) | 39.3 | 39.3 | 39.3 | 39.3 | 39.3 | 39.3 | 39.3 | 39.5 | 39.5 |
| Intermediate layer | 1$^{st}$ Inte. layer composition No. | A | A | A | A | A | A | A | B | B |
| | 1$^{st}$ Inte. layer slab hardness (Shore D) | 65 | 65 | 65 | 65 | 65 | 65 | 65 | 65 | 65 |
| | 1$^{st}$ Inte. layer thickness (mm) | 1.0 | 1.0 | 1.0 | 1.0 | 1.0 | 1.0 | 1.0 | 1.0 | 1.0 |
| | 2$^{nd}$ Inte. layer composition No. | — | — | — | — | — | — | — | C | C |
| | 2$^{nd}$ Inte. layer slab hardness (Shore D) | — | — | — | — | — | — | — | 29 | 29 |
| | 2$^{nd}$ Inte. layer thickness (mm) | — | — | — | — | — | — | — | 0.3 | 0.3 |
| Cover | Outer cover layer composition No. | a | b | c | d | e | f | e | k | k |
| | Outer cover layer slab hardness (Shore D) | 7 | 10 | 20 | 25 | 32 | 50 | 32 | 29 | 29 |
| | Outer cover layer thickness (mm) | 0.5 | 0.5 | 0.5 | 0.5 | 0.5 | 0.5 | 0.5 | 0.3 | 0.3 |

TABLE 12

| | | Golf ball body No. | | | | | |
|---|---|---|---|---|---|---|---|
| | | 40 | 41-48 | 49 | 50 | 51-53 | 54 | 55 |
| Golf ball structure (piece) | | 3 | 3 | 3 | 3 | 3 | 4 | 5 |
| Spherical core | Center rubber composition No. | o | o | o | o | o | n | n |
| | Center diameter (mm) | — | — | — | — | — | — | — |
| | Envelope layer rubber composition No. | — | — | — | — | — | — | — |
| | Spherical core diameter (mm) | 39.3 | 39.3 | 39.3 | 39.3 | 39.3 | 37.9 | 36.3 |
| Intermediate layer | 1$^{st}$ Inte. layer composition No. | A | A | A | A | A | D | D |
| | 1$^{st}$ Inte. layer slab hardness (Shore D) | 65 | 65 | 65 | 65 | 65 | — | — |
| | 1$^{st}$ Inte. layer thickness (mm) | 1.0 | 1.0 | 1.0 | 1.0 | 1.0 | 0.8 | 0.8 |
| | 2$^{nd}$ Inte. layer composition No. | — | — | — | — | — | E | E |
| | 2$^{nd}$ Inte. layer slab hardness (Shore D) | — | — | — | — | — | — | — |
| | 2$^{nd}$ Inte. layer thickness (mm) | — | — | — | — | — | 0.8 | 0.8 |
| | 3$^{rd}$ Inte. layer composition No. | — | — | — | — | — | — | F |
| | 3$^{rd}$ Inte. layer slab hardness (Shore D) | — | — | — | — | — | — | — |
| | 3$^{rd}$ Inte. layer thickness (mm) | — | — | — | — | — | — | 0.8 |
| Cover | Outer cover layer composition No. | g | h | i | j | h | l | l |
| | Outer cover layer slab hardness (Shore D) | 60 | 67 | 73 | 76 | 67 | 61 | 61 |
| | Outer cover layer thickness (mm) | 0.5 | 0.5 | 0.5 | 0.5 | 0.5 | 0.8 | 0.8 |

TABLE 13

| | | Golf ball body No. | | | | | | | | |
|---|---|---|---|---|---|---|---|---|---|---|
| | | 56-59 | 60 | 61 | 62-69 | 70 | 71-74 | 75-77 | 78 | 79 |
| Golf ball structure (piece) | | 3 | 3 | 3 | 3 | 3 | 3 | 3 | 4 | 5 |
| Spherical core | Center rubber composition No. | a | b | c | d | e | f | d | k | l |
| | Center diameter (mm) | — | — | — | — | — | — | — | — | 15 |
| | Envelope layer rubber composition No. | — | — | — | — | — | — | — | — | m |
| | Spherical core diameter (mm) | 39.7 | 39.7 | 39.7 | 39.7 | 39.7 | 39.7 | 39.7 | 39.5 | 39.5 |
| | Compression deformation amount (mm) | 1.85 | 2.14 | 2.15 | 2.35 | 2.65 | 3.05 | 2.35 | 2.50 | 2.50 |
| Intermediate layer | $1^{st}$ Inte. layer composition No. | G | G | G | G | G | G | G | B | B |
| | $1^{st}$ Inte. layer slab hardness (Shore D) | — | — | — | — | — | — | — | 65 | 65 |
| | $1^{st}$ Inte. layer thickness (mm) | 1.0 | 1.0 | 1.0 | 1.0 | 1.0 | 1.0 | 1.0 | 1.0 | 1.0 |
| | $2^{nd}$ Inte. layer composition No. | — | — | — | — | — | — | — | C | C |
| | $2^{nd}$ Inte. layer slab hardness (Shore D) | — | — | — | — | — | — | — | — | — |
| | $2^{nd}$ Inte. layer thickness (mm) | — | — | — | — | — | — | — | 0.3 | 0.3 |
| Cover | Outer cover layer composition No. | e | e | e | e | e | e | e | k | k |
| | Outer cover layer slab hardness (Shore D) | 32 | 32 | 32 | 32 | 32 | 32 | 32 | 29 | 29 |
| | Outer cover layer thickness (mm) | 0.5 | 0.5 | 0.5 | 0.5 | 0.5 | 0.5 | 0.5 | 0.3 | 0.3 |

TABLE 14

| | | Golf ball body No. | | | | | | |
|---|---|---|---|---|---|---|---|---|
| | | 80-87 | 88 | 89-91 | 92-95 | 96-98 | 99 | 100 |
| Golf ball structure (piece) | | 3 | 3 | 3 | 3 | 3 | 4 | 5 |
| Spherical core | Center rubber composition No. | g | h | i | j | g | n | n |
| | Center diameter (mm) | — | — | — | — | — | — | — |
| | Envelope layer rubber composition No. | — | — | — | — | — | — | — |
| | Spherical core diameter (mm) | 39.7 | 39.7 | 39.7 | 39.7 | 39.7 | 37.9 | 36.3 |
| | Compression deformation amount (mm) | 3.65 | 4.15 | 4.85 | 5.05 | 3.65 | 3.83 | 3.83 |
| Intermediate layer | $1^{st}$ Inte. layer composition No. | G | G | G | G | G | D | D |
| | $1^{st}$ Inte. layer slab hardness (Shore D) | — | — | — | — | — | — | — |
| | $1^{st}$ Inte. layer thickness (mm) | 1.0 | 1.0 | 1.0 | 1.0 | 1.0 | 0.8 | 0.8 |
| | $2^{nd}$ Inte. layer composition No. | — | — | — | — | — | E | E |
| | $2^{nd}$ Inte. layer slab hardness (Shore D) | — | — | — | — | — | — | — |
| | $2^{nd}$ Inte. layer thickness (mm) | — | — | — | — | — | 0.8 | 0.8 |
| | $3^{rd}$ Inte. layer composition No. | — | — | — | — | — | — | F |
| | $3^{rd}$ Inte. layer slab hardness (Shore D) | — | — | — | — | — | — | — |
| | $3^{rd}$ Inte. layer thickness (mm) | — | — | — | — | — | — | 0.8 |
| Cover | Outer cover layer composition No. | e | e | e | e | e | l | l |
| | Outer cover layer slab hardness (Shore D) | 32 | 32 | 32 | 32 | 32 | 61 | 61 |
| | Outer cover layer thickness (mm) | 0.5 | 0.5 | 0.5 | 0.5 | 0.5 | 0.8 | 0.8 |

TABLE 15

| | | Golf ball body No. | | | | | |
|---|---|---|---|---|---|---|---|
| | | 101-120 | 121 | 122 | 123-145 | 146 | 147 |
| | Golf ball structure (Piece) | 3 | 4 | 5 | 3 | 4 | 5 |
| Spherical core | Center rubber composition No. | o | p | t | o | p | t |
| | Center diameter (mm) | — | — | 15.0 | — | — | 15.0 |
| | Envelope layer rubber composition No. | — | — | r | — | — | r |
| | Spherical core diameter (mm) | 39.3 | 39.5 | 39.5 | 39.3 | 39.5 | 39.5 |
| Intermediate layer | Intermediate layer composition No. | A | B | B | A | B | B |
| | Intermediate layer slab hardness (Shore D) | 65 | 65 | 65 | 65 | 65 | 65 |
| | Intermediate layer thickness (mm) | 1.0 | 1.0 | 1.0 | 1.0 | 1.0 | 1.0 |
| Cover | Inner cover layer composition No. | — | n | n | — | n | n |
| | Inner cover layer slab hardness (Shore D) | — | 47 | 47 | — | 47 | 47 |
| | Inner cover layer thickness (mm) | — | 0.3 | 0.3 | — | 0.3 | 0.3 |
| | Outer cover layer composition No. | m | k | k | m | k | k |
| | Outer cover layer slab hardness (Shore D) | 32 | 29 | 29 | 32 | 29 | 29 |
| | Outer cover layer thickness (mm) | 0.7 | 0.3 | 0.3 | 0.7 | 0.3 | 0.3 |

TABLE 16

| | | Golf ball No. | | | | | | | | | |
|---|---|---|---|---|---|---|---|---|---|---|---|
| | | 1 | 2 | 3 | 4 | 5 | 6 | 7 | 8 | 9 | 10 |
| Paint film properties | Paint No. | V | A | B | U | B1 | B2 | B3 | B4 | T | B6 |
| | NCO/OH | 0.2/1.0 | 0.38/1.0 | 0.5/1.0 | 0.07/1.0 | 0.5/1.0 | 0.5/1.0 | 0.5/1.0 | 0.5/1.0 | 0.5/1.0 | 0.5/1.0 |
| | Coefficient of Friction | 0.55 | 0.46 | 0.42 | 0.65 | 0.63 | 0.54 | 0.41 | 0.33 | 0.61 | 0.44 |
| | Martens Hardness (mgf/μm$^2$) | 0.09 | 0.14 | 0.25 | 0.03 | 0.07 | 0.09 | 0.51 | 3.70 | 0.07 | 0.15 |
| | Storage modulus $E'_{120}$ (×10$^7$ dyn/cm$^2$) at 120° C. | 1.86 | 1.97 | 4.01 | 1.46 | 1.74 | 1.83 | 5.03 | 10.3 | 1.76 | 3.03 |
| | Storage modulus $E'_{150}$ (×10$^7$ dyn/cm$^2$) at 150° C. | 1.63 | 1.91 | 3.95 | 0.91 | 1.00 | 1.59 | 4.89 | 9.61 | 1.01 | 2.78 |
| | $\|E'_{120} - E'_{150}\|$ (×10$^7$ dyn/cm$^2$) | 0.23 | 0.06 | 0.06 | 0.55 | 0.74 | 0.24 | 0.14 | 0.69 | 0.75 | 0.25 |
| | Loss tangent (Tan σ, 10° C.) | 0.230 | 0.241 | 0.152 | 0.280 | 0.253 | 0.232 | 0.110 | 0.049 | 0.250 | 0.187 |
| | Paint film thickness (μm) | 20 | 20 | 20 | 20 | 20 | 20 | 20 | 20 | 20 | 20 |
| | 10% elastic modulus (kgf/cm$^2$) | 5 | 8 | 38 | 0.5 | 2 | 5 | 60 | 165 | 2 | 20 |
| Ball evaluation | Spin rate (rpm) on approach shots less than 40 yards (10 m/s) | 3491 | 3484 | 3452 | 3400 | 3450 | 3495 | 3397 | 3120 | 3448 | 3478 |
| | Launch angle (°) (10 m/s) | 36.45 | 36.50 | 36.75 | 36.99 | 36.76 | 36.41 | 37.00 | 38.12 | 36.77 | 36.60 |
| | Shot feeling | E | E | E | P | G | E | E | F | G | E |

TABLE 17

| | | Golf ball No. | | | | | |
|---|---|---|---|---|---|---|---|
| | | 11 | 12 | 13 | 14 | 15 | 16 |
| Paint film properties | Paint No. | B7 | B8 | C | CS | S | D |
| | NCO/OH | 0.5/1.0 | 0.5/1.0 | 0.8/1.0 | 1.0/1.0 | 1.2/1.0 | 1.6/1.0 |
| | Coefficient of Friction | 0.39 | 0.33 | 0.38 | 0.35 | 0.32 | 0.28 |
| | Martens Hardness (mgf/μm$^2$) | 1.80 | 3.90 | 2.80 | 3.60 | 4.30 | 6.50 |
| | Storage modulus $E'_{120}$ (×10$^7$ dyn/cm$^2$) at 120° C. | 6.56 | 10.8 | 7.54 | 9.84 | 11.7 | 23.5 |
| | Storage modulus $E'_{150}$ (×10$^7$ dyn/cm$^2$) at 150° C. | 6.11 | 10.3 | 7.55 | 9.40 | 11.1 | 16.2 |
| | $\|E'_{120} - E'_{150}\|$ (×10$^7$ dyn/cm$^2$) | 0.45 | 0.50 | 0.01 | 0.44 | 0.60 | 7.30 |
| | Loss tangent (Tan σ, 10° C.) | 0.077 | 0.048 | 0.068 | 0.050 | 0.053 | 0.045 |
| | Paint film thickness (μm) | 20 | 20 | 20 | 20 | 20 | 20 |
| | 10% elastic modulus (kgf/cm$^2$) | 100 | 175 | 126 | 160 | 186 | 275 |
| Ball evaluation | Spin rate (rpm) on approach shots less than 40 yards (10 m/s) | 3345 | 3066 | 3316 | 3145 | 3043 | 2970 |
| | Launch angle (°) (10 m/s) | 37.25 | 38.22 | 37.59 | 38.00 | 38.51 | 39.10 |
| | Shot feeling | E | P | G | F | P | P |

| | | Golf ball No. | | | | |
|---|---|---|---|---|---|---|
| | | 17 | 18 | 19 | 20 | 21 |
| Paint film properties | Paint No. | B | B | CB | B | B |
| | NCO/OH | 0.5/1.0 | 0.5/1.0 | 0.74/1.0 | 0.5/1.0 | 0.5/1.0 |
| | Coefficient of Friction | 0.42 | 0.42 | 0.39 | 0.42 | 0.42 |
| | Martens Hardness (mgf/μm$^2$) | 0.25 | 0.25 | 2.2 | 0.25 | 0.25 |
| | Storage modulus $E'_{120}$ (×10$^7$ dyn/cm$^2$) at 120° C. | 4.01 | 4.01 | 7.06 | 4.01 | 4.01 |
| | Storage modulus $E'_{150}$ (×10$^7$ dyn/cm$^2$) at 150° C. | 3.95 | 3.95 | 6.78 | 3.95 | 3.95 |
| | $\|E'_{120} - E'_{150}\|$ (×10$^7$ dyn/cm$^2$) | 0.06 | 0.06 | 0.28 | 0.06 | 0.06 |
| | Loss tangent (Tan σ, 10° C.) | 0.152 | 0.152 | 0.7 | 0.152 | 0.152 |
| | Paint film thickness (μm) | 30 | 40 | 20 | 20 | 20 |
| | 10% elastic modulus (kgf/cm$^2$) | 38 | 38 | 110 | 38 | 38 |
| Ball evaluation | Spin rate (rpm) on approach shots less than 40 yards (10 m/s) | 3492 | 3524 | 3333 | 3461 | 3471 |
| | Launch angle (°) (10 m/s) | 36.45 | 36.28 | 37.45 | 36.67 | 36.62 |
| | Shot feeling | E | E | E | E | E |

TABLE 18

| | | Golf ball No. | | | | | | | | |
|---|---|---|---|---|---|---|---|---|---|---|
| | | 22 | 23 | 24 | 25 | 26 | 27 | 28 | 29 | 30 |
| Paint film properties | Paint No. | B | B | B | B | U | T | V | A | B |
| | NCO/OH | 0.5/1.0 | 0.5/1.0 | 0.5/1.0 | 0.5/1.0 | 0.07/1.0 | 0.5/1.0 | 0.2/1.0 | 0.38/1.0 | 0.5/1.0 |
| | Coefficient of Friction | 0.42 | 0.42 | 0.42 | 0.42 | 0.65 | 0.61 | 0.55 | 0.46 | 0.42 |
| | Martens Hardness (mgf/μm$^2$) | 0.25 | 0.25 | 0.25 | 0.25 | 0.03 | 0.07 | 0.09 | 0.14 | 0.25 |
| | 10% elastic modulus (kgf/cm$^2$) | 38 | 38 | 38 | 38 | 0.5 | 2 | 5 | 8 | 38 |
| | Loss tangent (Tan σ, 10° C.) | 0.15 | 0.15 | 0.15 | 0.15 | 0.28 | 0.25 | 0.230 | 0.24 | 0.15 |
| | Storage modulus $E'_{120}$ (×10$^7$ dyn/cm$^2$) at 120° C. | 4.01 | 4.01 | 4.01 | 4.01 | 1.46 | 1.76 | 1.86 | 1.97 | 4.01 |
| | Storage modulus $E'_{150}$ (×10$^7$ dyn/cm$^2$) at 150° C. | 3.95 | 3.95 | 3.95 | 3.95 | 0.91 | 1.01 | 1.63 | 1.91 | 3.95 |
| | $|E'_{120} - E'_{150}|$ (×10$^7$ dyn/cm$^2$) | 0.06 | 0.06 | 0.06 | 0.06 | 0.55 | 0.75 | 0.23 | 0.06 | 0.06 |
| | Paint film thickness (μm) | 20 | 20 | 20 | 20 | 20 | 20 | 20 | 20 | 20 |
| Cover | Cover composition No. | a | b | c | d | e | e | e | e | e |
| | Cover thickness (mm) | 0.5 | 0.5 | 0.5 | 0.5 | 0.5 | 0.5 | 0.5 | 0.5 | 0.5 |
| | Cover slab hardness (Shore D) | 7 | 10 | 20 | 25 | 32 | 32 | 32 | 32 | 32 |
| Ball evaluation | Spin rate (rpm) on approach shots (21 m/s) | 1255 | 1055 | 756 | 456 | 139 | 144 | 170 | 160 | 146 |
| | Spin rate (rpm) on approach shots (10 m/s) | 1307 | 1207 | 989 | 738 | 399 | 407 | 451 | 441 | 409 |
| | Launch angle (°) (10 m/s) | −5.35 | −4.85 | −4.35 | −3.55 | −1.53 | −1.62 | −1.95 | −1.85 | −1.65 |
| | Shot feeling | F | G | E | E | P | G | E | E | E |

TABLE 19

| | | Golf ball No. | | | | | | | | |
|---|---|---|---|---|---|---|---|---|---|---|
| | | 31 | 32 | 33 | 34 | 35 | 36 | 37 | 38 | 39 |
| Paint film properties | Paint No. | C | S | D | B | B | B | CB | B | B |
| | NCO/OH | 0.8/1.0 | 1.2/1.0 | 1.6/1.0 | 0.5/1.0 | 0.5/1.0 | 0.5/1.0 | 0.74/1.0 | 0.5/1.0 | 0.5/1.0 |
| | Coefficient of Friction | 0.38 | 0.32 | 0.28 | 0.42 | 0.42 | 0.42 | 0.39 | 0.42 | 0.42 |
| | Martens Hardness (mgf/μm$^2$) | 2.80 | 4.30 | 6.5 | 0.25 | 0.25 | 0.25 | 2.20 | 0.25 | 0.25 |
| | 10% elastic modulus (kgf/cm$^2$) | 126 | 186 | 275 | 38 | 38 | 38 | 110 | 38 | 38 |
| | Loss tangent (Tan σ, 10° C.) | 0.068 | 0.053 | 0.045 | 0.15 | 0.15 | 0.15 | 0.070 | 0.15 | 0.15 |
| | Storage modulus $E'_{120}$ (×10$^7$ dyn/cm$^2$) at 120° C. | 7.54 | 11.7 | 23.5 | 4.01 | 4.01 | 4.01 | 7.06 | 4.01 | 4.01 |
| | Storage modulus $E'_{150}$ (×10$^7$ dyn/cm$^2$) at 150° C. | 7.55 | 11.1 | 16.2 | 3.95 | 3.95 | 3.95 | 6.78 | 3.95 | 3.95 |
| | $|E'_{120} - E'_{150}|$ (×10$^7$ dyn/cm$^2$) | 0.01 | 0.60 | 7.30 | 0.06 | 0.06 | 0.06 | 0.28 | 0.06 | 0.06 |
| | Paint film thickness (μm) | 20 | 20 | 20 | 20 | 30 | 40 | 20 | 20 | 20 |
| Cover | Cover composition No. | e | e | e | f | e | e | e | k | k |
| | Cover thickness (mm) | 0.5 | 0.5 | 0.5 | 0.5 | 0.5 | 0.5 | 0.5 | 0.3 | 0.3 |
| | Cover slab hardness (Shore D) | 32 | 32 | 32 | 50 | 32 | 32 | 32 | 29 | 29 |
| Ball evaluation | Spin rate (rpm) on approach shots (21 m/s) | 120 | 0 | −199 | −224 | 186 | 226 | 130 | 305 | 315 |
| | Spin rate (rpm) on approach shots (10 m/s) | 272 | 0 | −74 | 88 | 431 | 445 | 290 | 450 | 455 |
| | Launch angle (°) (10 m/s) | −0.75 | 0.00 | 0.65 | −0.25 | −1.83 | −1.87 | −0.90 | −1.90 | −1.91 |
| | Shot feeling | E | F | P | G | E | E | E | E | E |

TABLE 20

| | | Golf ball No. | | | | | | | | |
|---|---|---|---|---|---|---|---|---|---|---|
| | | 40 | 41 | 42 | 43 | 44 | 45 | 46 | 47 | 48 |
| Paint film properties | Paint No. | B | U | T | V | A | B | C | S | D |
| | NCO/OH | 0.5/1.0 | 0.07/1.0 | 0.5/1.0 | 0.2/1.0 | 0.38/1.0 | 0.5/1.0 | 0.8/1.0 | 1.2/1.0 | 1.6/1.0 |
| | Coefficient of Friction | 0.42 | 0.65 | 0.61 | 0.55 | 0.46 | 0.42 | 0.38 | 0.32 | 0.28 |
| | Martens Hardness (mgf/μm$^2$) | 0.25 | 0.03 | 0.07 | 0.09 | 0.14 | 0.25 | 2.80 | 4.30 | 6.5 |
| | 10% elastic modulus (kgf/cm$^2$) | 38 | 0.5 | 2 | 5 | 8 | 38 | 126 | 186 | 275 |
| | Loss tangent (Tan σ, 10° C.) | 0.15 | 0.28 | 0.25 | 0.230 | 0.24 | 0.15 | 0.068 | 0.053 | 0.045 |
| | Storage modulus $E'_{120}$ (×10$^7$ dyn/cm$^2$) at 120° C. | 4.01 | 1.46 | 1.76 | 1.86 | 1.97 | 4.01 | 7.54 | 11.7 | 23.5 |
| | Storage modulus $E'_{150}$ (×10$^7$ dyn/cm$^2$) at 150° C. | 3.95 | 0.91 | 1.01 | 1.63 | 1.91 | 3.95 | 7.55 | 11.1 | 16.2 |
| | $|E'_{120} - E'_{150}|$ (×10$^7$ dyn/cm$^2$) | 0.06 | 0.55 | 0.75 | 0.23 | 0.06 | 0.06 | 0.01 | 0.60 | 7.30 |
| | Paint film thickness (μm) | 20 | 20 | 20 | 20 | 20 | 20 | 20 | 20 | 20 |
| Cover | Cover composition No. | g | h | h | h | h | h | h | h | h |
| | Cover thickness (mm) | 0.5 | 0.5 | 0.5 | 0.5 | 0.5 | 0.5 | 0.5 | 0.5 | 0.5 |
| | Cover slab hardness (Shore D) | 60 | 67 | 67 | 67 | 67 | 67 | 67 | 67 | 67 |

TABLE 20-continued

|  |  | Golf ball No. | | | | | | | | |
|---|---|---|---|---|---|---|---|---|---|---|
|  |  | 40 | 41 | 42 | 43 | 44 | 45 | 46 | 47 | 48 |
| Ball evaluation | Spin rate (rpm) on approach shots (10 m/s) | 781 | 375 | 399 | 451 | 441 | 409 | 272 | 0 | −74 |
|  | Launch angle (°) (10 m/s) | −4.00 | −1.66 | −1.75 | −2.60 | −2.50 | −1.80 | −1.00 | 0.00 | 2.00 |
|  | Driver spin rate (rpm) | 120 | 50 | 40 | 35 | 30 | 20 | 10 | 0 | −10 |

TABLE 21

|  |  | Golf ball No. | | | | | | |
|---|---|---|---|---|---|---|---|---|
|  |  | 49 | 50 | 51 | 52 | 53 | 54 | 55 |
| Paint film properties | Paint No. | B | B | B | B | CB | B | B |
|  | NCO/OH | 0.5/1.0 | 0.5/1.0 | 0.5/1.0 | 0.5/1.0 | 0.74/1.0 | 0.5/1.0 | 0.5/1.0 |
|  | Coefficient of Friction | 0.42 | 0.42 | 0.42 | 0.42 | 0.39 | 0.42 | 0.42 |
|  | Martens Hardness (mgf/μm$^2$) | 0.25 | 0.25 | 0.25 | 0.25 | 2.20 | 0.25 | 0.25 |
|  | 10% elastic modulus (kgf/cm$^2$) | 38 | 38 | 38 | 38 | 110 | 38 | 38 |
|  | Loss tangent (Tan σ, 10° C.) | 0.15 | 0.15 | 0.15 | 0.15 | 0.070 | 0.15 | 0.15 |
|  | Storage modulus $E'_{120}$ (×10$^7$ dyn/cm$^2$) at 120° C. | 4.01 | 4.01 | 4.01 | 4.01 | 7.06 | 4.01 | 4.01 |
|  | Storage modulus $E'_{150}$ (×10$^7$ dyn/cm$^2$) at 150° C. | 3.95 | 3.95 | 3.95 | 3.95 | 6.78 | 3.95 | 3.95 |
|  | $|E'_{120} - E'_{150}|$ (×10$^7$ dyn/cm$^2$) | 0.06 | 0.06 | 0.06 | 0.06 | 0.28 | 0.06 | 0.06 |
|  | Paint film thickness (μm) | 20 | 20 | 30 | 40 | 20 | 20 | 20 |
| Cover | Cover composition No. | i | j | h | h | h | l | l |
|  | Cover thickness (mm) | 0.5 | 0.5 | 0.5 | 0.5 | 0.5 | 0.8 | 0.8 |
|  | Cover slab hardness (Shore D) | 73 | 76 | 67 | 67 | 67 | 61 | 61 |
| Ball evaluation | Spin rate (rpm) on approach shots (10 m/s) | 209 | 109 | 429 | 449 | 331 | 591 | 592 |
|  | Launch angle (°) (10 m/s) | −1.40 | −0.70 | −2.10 | −2.17 | −0.79 | −3.50 | −5.90 |
|  | Driver spin rate (rpm) | −80 | −180 | 25 | 30 | 10 | 5 | 0 |

TABLE 22

|  |  | Golf ball No. | | | | | | | | | | | |
|---|---|---|---|---|---|---|---|---|---|---|---|---|---|
|  |  | 56 | 57 | 58 | 59 | 60 | 61 | 62 | 63 | 64 | 65 | 66 | 67 |
| Paint film properties | Paint No. | A | B | C | S | B | B | U | T | V | A | B | C |
|  | NCO/OH | 0.38/1.0 | 0.5/1.0 | 0.8/1.0 | 1.2/1.0 | 0.5/1.0 | 0.5/1.0 | 0.07/1.0 | 0.5/1.0 | 0.2/1.0 | 0.38/1.0 | 0.5/1.0 | 0.8/1.0 |
|  | Coefficient of Friction | 0.46 | 0.42 | 0.38 | 0.32 | 0.42 | 0.42 | 0.65 | 0.61 | 0.55 | 0.46 | 0.42 | 0.38 |
|  | Martens Hardness (mgf/μm$^2$) | 0.14 | 0.25 | 2.80 | 4.30 | 0.25 | 0.25 | 0.03 | 0.07 | 0.09 | 0.14 | 0.25 | 2.80 |
|  | 10% elastic modulus (kgf/cm$^2$) | 8 | 38 | 126 | 186 | 38 | 38 | 0.5 | 2 | 5 | 8 | 38 | 126 |
|  | Loss tangent (Tan σ, 10° C.) | 0.24 | 0.15 | 0.068 | 0.053 | 0.15 | 0.15 | 0.28 | 0.25 | 0.23 | 0.24 | 0.15 | 0.068 |
|  | Storage modulus $E'_{120}$ (×10$^7$ dyn/cm$^2$) at 120° C. | 1.97 | 4.01 | 7.54 | 11.7 | 4.01 | 4.01 | 1.46 | 1.76 | 1.86 | 1.97 | 4.01 | 7.54 |
|  | Storage modulus $E'_{150}$ (×10$^7$ dyn/cm$^2$) at 150° C. | 1.91 | 3.95 | 7.55 | 11.1 | 3.95 | 3.95 | 0.91 | 1.01 | 1.63 | 1.91 | 3.95 | 7.55 |
|  | $|E'_{120} - E'_{150}|$ (×10$^7$ dyn/cm$^2$) | 0.06 | 0.06 | 0.01 | 0.60 | 0.06 | 0.06 | 0.55 | 0.75 | 0.23 | 0.06 | 0.06 | 0.01 |
|  | Paint film thickness (μm) | 20 | 20 | 20 | 20 | 20 | 20 | 20 | 20 | 20 | 20 | 20 | 20 |
| Ball | Compression deformation amount (mm) | 1.50 | 1.50 | 1.50 | 1.50 | 1.79 | 1.80 | 2.00 | 2.00 | 2.00 | 2.00 | 2.00 | 2.00 |
|  | Product of Compression deformation amount (mm) × Tan σ | 0.36 | 0.23 | 0.10 | 0.08 | 0.27 | 0.27 | 0.56 | 0.50 | 0.46 | 0.48 | 0.30 | 0.14 |
| Ball evaluation | Spin rate (rpm) on approach shots (21 m/s) | 580 | 566 | 540 | 420 | 327 | 316 | 139 | 144 | 170 | 160 | 146 | 120 |
|  | Spin rate (rpm) on approach shots (10 m/s) | 641 | 609 | 473 | 200 | 517 | 509 | 399 | 407 | 451 | 441 | 409 | 273 |

TABLE 22-continued

| | | Golf ball No. | | | | | | | | | | | |
|---|---|---|---|---|---|---|---|---|---|---|---|---|
| | | 56 | 57 | 58 | 59 | 60 | 61 | 62 | 63 | 64 | 65 | 66 | 67 |
| | Launch angle (°) (10 m/s) | −3.60 | −3.40 | −2.60 | −1.15 | −2.90 | −2.91 | −1.53 | −1.62 | −2.60 | −2.50 | −2.40 | −1.60 |
| | Shot feeling | P | P | P | P | F | F | P | G | G | G | G | G |

TABLE 23

| | | Golf ball No. | | | | | | | | | | | |
|---|---|---|---|---|---|---|---|---|---|---|---|---|
| | | 68 | 69 | 70 | 71 | 72 | 73 | 74 | 75 | 76 | 77 | 78 | 79 |
| Paint film properties | Paint No. | S | D | B | A | B | C | S | B | B | CB | B | B |
| | NCO/OH | 1.2/1.0 | 1.6/1.0 | 0.5/1.0 | 0.38/1.0 | 0.5/1.0 | 0.8/1.0 | 1.2/1.0 | 0.5/1.0 | 0.5/1.0 | 0.74/1.0 | 0.5/1.0 | 0.5/1.0 |
| | Coefficient of Friction | 0.32 | 0.28 | 0.42 | 0.46 | 0.42 | 0.38 | 0.32 | 0.42 | 0.42 | 0.39 | 0.42 | 0.42 |
| | Martens Hardness (mgf/μm$^2$) | 4.30 | 6.5 | 0.25 | 0.14 | 0.25 | 2.80 | 4.30 | 0.25 | 0.25 | 2.20 | 0.25 | 0.25 |
| | 10% elastic modulus (kgf/cm$^2$) | 186 | 275 | 38 | 8 | 38 | 126 | 186 | 38 | 38 | 110 | 38 | 38 |
| | Loss tangent (Tan σ, 10° C.) | 0.053 | 0.045 | 0.15 | 0.24 | 0.15 | 0.068 | 0.053 | 0.15 | 0.15 | 0.070 | 0.15 | 0.15 |
| | Storage modulus $E'_{120}$ (×10$^7$ dyn/cm$^2$) at 120° C. | 11.7 | 23.5 | 4.01 | 1.97 | 4.01 | 7.54 | 11.7 | 4.01 | 4.01 | 7.06 | 4.01 | 4.01 |
| | Storage modulus $E'_{150}$ (×10$^7$ dyn/cm$^2$) at 150° C. | 11.1 | 16.2 | 3.95 | 1.91 | 3.95 | 7.55 | 11.1 | 3.95 | 3.95 | 6.78 | 3.95 | 3.95 |
| | $|E'_{120} - E'_{150}|$ (×10$^7$ dyn/cm$^2$) | 0.60 | 7.30 | 0.06 | 0.06 | 0.06 | 0.01 | 0.60 | 0.06 | 0.06 | 0.28 | 0.06 | 0.06 |
| | Paint film thickness (μm) | 20 | 20 | 20 | 20 | 20 | 20 | 20 | 30 | 40 | 20 | 20 | 20 |
| Ball | Compression deformation amount (mm) | 2.00 | 2.00 | 2.30 | 2.70 | 2.70 | 2.70 | 2.70 | 2.00 | 2.00 | 2.00 | 2.00 | 2.00 |
| | Product of Compression deformation amount (mm) × Tan σ | 0.11 | 0.09 | 0.35 | 0.65 | 0.41 | 0.18 | 0.14 | 0.30 | 0.30 | 0.14 | 0.43 | 0.40 |
| Ball evaluation | Spin rate (rpm) on approach shots (21 m/s) | 0 | −198 | 66 | −129 | −143 | −169 | −289 | 186 | 226 | 130 | 151 | 155 |
| | Spin rate (rpm) on approach shots (10 m/s) | 0 | −73 | 309 | 193 | 161 | 25 | −248 | 431 | 459 | 290 | 412 | 417 |
| | Launch angle (°) (10 m/s) | 0.00 | 0.20 | −1.80 | −1.12 | −0.90 | −0.10 | 0.80 | −1.09 | −1.16 | −0.78 | −0.81 | −0.82 |
| | Shot feeling | F | P | G | G | G | G | F | G | G | G | G | G |

TABLE 24

| | | Golf ball No. | | | | | | | | | | | |
|---|---|---|---|---|---|---|---|---|---|---|---|---|
| | | 80 | 81 | 82 | 83 | 84 | 85 | 86 | 87 | 88 | 89 | 90 | 91 |
| Paint film properties | Paint No. | U | T | V | A | B | C | S | D | B | A | B | S |
| | NCO/OH | 0.07/1.0 | 0.5/1.0 | 0.2/1.0 | 0.38/1.0 | 0.5/1.0 | 0.8/1.0 | 1.2/1.0 | 1.6/1.0 | 0.5/1.0 | 0.38/1.0 | 0.5/1.0 | 1.2/1.0 |
| | Coefficient of Friction | 0.65 | 0.61 | 0.55 | 0.46 | 0.42 | 0.38 | 0.32 | 0.28 | 0.42 | 0.46 | 0.42 | 0.32 |
| | Martens Hardness (mgf/μm$^2$) | 0.03 | 0.07 | 0.09 | 0.14 | 0.25 | 2.80 | 4.30 | 6.5 | 0.25 | 0.14 | 0.25 | 4.30 |
| | 10% elastic modulus (kgf/cm$^2$) | 0.5 | 2 | 5 | 8 | 38 | 126 | 186 | 275 | 38 | 8 | 38 | 186 |
| | Loss tangent (Tan σ, 10° C.) | 0.28 | 0.25 | 0.23 | 0.24 | 0.15 | 0.068 | 0.053 | 0.045 | 0.15 | 0.24 | 0.15 | 0.053 |
| | Storage modulus $E'_{120}$ (×10$^7$ dyn/cm$^2$) at 120° C. | 1.46 | 1.76 | 1.86 | 1.97 | 4.01 | 7.54 | 11.7 | 23.5 | 4.01 | 1.97 | 4.01 | 11.7 |
| | Storage modulus $E'_{150}$ (×10$^7$ dyn/cm$^2$) at 150° C. | 0.91 | 1.01 | 1.63 | 1.91 | 3.95 | 7.55 | 11.1 | 16.2 | 3.95 | 1.91 | 3.95 | 11.1 |

TABLE 24-continued

| | | Golf ball No. | | | | | | | | | | | |
|---|---|---|---|---|---|---|---|---|---|---|---|---|
| | | 80 | 81 | 82 | 83 | 84 | 85 | 86 | 87 | 88 | 89 | 90 | 91 |
| | $|E'_{120} - E'_{150}$ $(\times 10^7 \text{ dyn/cm}^2)|$ | 0.55 | 0.75 | 0.23 | 0.06 | 0.06 | 0.01 | 0.60 | 7.30 | 0.06 | 0.06 | 0.06 | 0.60 |
| | Paint film thickness (μm) | 20 | 20 | 20 | 20 | 20 | 20 | 20 | 20 | 20 | 20 | 20 | 20 |
| Ball | Compression deformation amount (mm) | 3.30 | 3.30 | 3.30 | 3.30 | 3.30 | 3.30 | 3.30 | 3.30 | 3.80 | 4.50 | 4.50 | 4.50 |
| | Product of Compression deformation amount (mm) × Tan σ | 0.92 | 0.83 | 0.76 | 0.80 | 0.50 | 0.23 | 0.17 | 0.15 | 0.58 | 1.08 | 0.68 | 0.24 |
| Ball evaluation | Spin rate (rpm) on approach shots (10 m/s) | 375 | 399 | 451 | 441 | 409 | 273 | 0 | −73 | 209 | 91 | 59 | −350 |
| | Launch angle (°) (10 m/s) | −1.66 | −1.75 | −1.89 | −1.79 | −1.69 | −1.20 | 0.00 | 0.22 | −1.05 | −0.40 | −0.28 | 1.80 |
| | Shot feeling | P | G | G | G | G | G | G | F | G | G | G | G |
| | Driver spin rate (rpm) | 40 | 35 | 30 | 25 | 15 | 5 | 0 | −10 | 90 | 205 | 195 | 175 |

TABLE 25

| | | Golf ball No. | | | | | | | | |
|---|---|---|---|---|---|---|---|---|---|---|
| | | 92 | 93 | 94 | 95 | 96 | 97 | 98 | 99 | 100 |
| Paint film properties | Paint No. | A | B | C | S | B | B | CB | B | B |
| | NCO/OH | 0.38/1.0 | 0.5/1.0 | 0.8/1.0 | 1.2/1.0 | 0.5/1.0 | 0.5/1.0 | 0.74/1.0 | 0.5/1.0 | 0.5/1.0 |
| | Coefficient of Friction | 0.46 | 0.42 | 0.38 | 0.32 | 0.42 | 0.42 | 0.39 | 0.42 | 0.42 |
| | Martens Hardness (mgf/μm²) | 0.14 | 0.25 | 2.80 | 4.30 | 0.25 | 0.25 | 2.20 | 0.25 | 0.25 |
| | 10% elastic modulus (kgf/cm²) | 8 | 38 | 126 | 186 | 38 | 38 | 110 | 38 | 38 |
| | Loss tangent (Tan σ, 10° C.) | 0.24 | 0.15 | 0.068 | 0.053 | 0.15 | 0.15 | 0.070 | 0.15 | 0.15 |
| | Storage modulus $E'_{120}$ ($\times 10^7$ dyn/cm²) at 120° C. | 1.97 | 4.01 | 7.54 | 11.7 | 4.01 | 4.01 | 7.06 | 4.01 | 4.01 |
| | Storage modulus $E'_{150}$ ($\times 10^7$ dyn/cm²) at 150° C. | 1.91 | 3.95 | 7.55 | 11.1 | 3.95 | 3.95 | 6.78 | 3.95 | 3.95 |
| | $|E'_{120} - E'_{150}$ ($\times 10^7$ dyn/cm²)| | 0.06 | 0.06 | 0.01 | 0.60 | 0.06 | 0.06 | 0.28 | 0.06 | 0.06 |
| | Paint film thickness (μm) | 20 | 20 | 20 | 20 | 30 | 40 | 20 | 20 | 20 |
| Ball | Compression deformation amount (mm) | 4.70 | 4.70 | 4.70 | 4.70 | 3.30 | 3.30 | 3.30 | 3.20 | 3.20 |
| | Product of Compression deformation amount (mm) × Tan σ | 1.13 | 0.71 | 0.32 | 0.25 | 0.50 | 0.50 | 0.23 | 0.49 | 0.49 |
| Ball evaluation | Spin rate (rpm) on approach shots (10 m/s) | 41 | 9 | −128 | −400 | 449 | 489 | 312 | 431 | 435 |
| | Launch angle (°) (10 m/s) | −0.20 | −0.10 | 0.78 | 2.30 | −1.82 | −2.00 | −1.30 | −1.79 | −1.80 |
| | Shot feeling | G | G | G | G | G | G | G | G | G |
| | Driver spin rate (rpm) | 235 | 225 | 215 | 205 | 10 | 10 | 10 | 0 | 0 |

TABLE 26

| | | Golf ball No. | | | | | | | | | | |
|---|---|---|---|---|---|---|---|---|---|---|---|---|
| | | 101 | 102 | 103 | 104 | 105 | 106 | 107 | 108 | 109 | 110 | 111 |
| Paint film properties | Paint No. | B | U | T | V | A | B | C | S | D | A | B |
| | NCO/OH | 0.5/1.0 | 0.07/1.0 | 0.5/1.0 | 0.2/1.0 | 0.38/1.0 | 0.5/1.0 | 0.8/1.0 | 1.2/1.0 | 1.6/1.0 | 0.38/1.0 | 0.5/1.0 |
| | Coefficient of Friction | 0.42 | 0.65 | 0.61 | 0.55 | 0.46 | 0.42 | 0.38 | 0.32 | 0.28 | 0.46 | 0.42 |
| | Martens Hardness (mgf/μm²) | 0.25 | 0.03 | 0.07 | 0.09 | 0.14 | 0.25 | 2.80 | 4.30 | 6.5 | 0.14 | 0.25 |
| | 10% elastic modulus (kgf/cm²) | 38 | 0.5 | 2 | 5 | 8 | 38 | 126 | 186 | 275 | 8 | 38 |
| | Storage modulus $E'_{120}$ ($\times 10^7$ dyn/cm²) at 120° C. | 4.01 | 1.46 | 1.76 | 1.86 | 1.97 | 4.01 | 7.54 | 11.7 | 23.5 | 1.97 | 4.01 |
| | Storage modulus $E'_{150}$ ($\times 10^7$ dyn/cm²) at 150° C. | 3.95 | 0.91 | 1.01 | 1.63 | 1.91 | 3.95 | 7.55 | 11.1 | 16.2 | 1.91 | 3.95 |
| | $|E'_{120} - E'_{150}$ ($\times 10^7$ dyn/cm²)| | 0.06 | 0.91 | 0.75 | 0.23 | 0.06 | 0.06 | 0.01 | 0.60 | 7.30 | 0.06 | 0.06 |
| | Paint film thickness (μm) | 20 | 20 | 20 | 20 | 20 | 20 | 20 | 20 | 20 | 20 | 20 |
| | Tan σ (10° C.) | 0.152 | 0.28 | 0.25 | 0.230 | 0.241 | 0.152 | 0.068 | 0.053 | 0.045 | 0.241 | 0.152 |
| Ball | Occupation ratio Y of dimple (%) | 57 | 63 | 63 | 63 | 63 | 63 | 63 | 63 | 63 | 68 | 68 |
| | Tan σ × occupation ratio Y of dimple | 8.66 | 17.64 | 15.75 | 14.49 | 15.18 | 9.58 | 4.28 | 3.34 | 2.84 | 16.39 | 10.34 |

TABLE 26-continued

|  |  | Golf ball No. | | | | | | | | | | |
| --- | --- | --- | --- | --- | --- | --- | --- | --- | --- | --- | --- |
|  |  | 101 | 102 | 103 | 104 | 105 | 106 | 107 | 108 | 109 | 110 | 111 |
| Ball evaluation | Spin rate (rpm) on approach shots (21 m/s) | 7600 | 7243 | 7279 | 7324 | 7314 | 7300 | 7274 | 7154 | 6956 | 7014 | 7000 |
|  | Spin rate (rpm) on approach shots (10 m/s) | 4150 | 3852 | 3912 | 3992 | 3982 | 3950 | 3814 | 3541 | 3468 | 3832 | 3800 |
|  | Launch angle (°) (10 m/s) | 33.65 | 34.70 | 34.49 | 33.94 | 34.04 | 34.14 | 34.59 | 36.20 | 36.60 | 34.56 | 34.65 |
|  | Flight distance on driver shots (m) | 220 | 222 | 222 | 222 | 222 | 222 | 222 | 222 | 222 | 223 | 223 |

TABLE 27

|  |  | Golf ball No. | | | | | |
| --- | --- | --- | --- | --- | --- | --- | --- |
|  |  | 112 | 113 | 114 | 115 | 116 | 117 |
| Paint film properties | Paint No. | C | S | A | B | C | S |
|  | NCO/OH | 0.8/1.0 | 1.2/1.0 | 0.38/1.0 | 0.5/1.0 | 0.8/1.0 | 1.2/1.0 |
|  | Coefficient of Friction | 0.38 | 0.32 | 0.46 | 0.42 | 0.38 | 0.32 |
|  | Martens Hardness (mgf/μm$^2$) | 2.80 | 4.30 | 0.14 | 0.25 | 2.80 | 4.30 |
|  | 10% elastic modulus (kgf/cm$^2$) | 126 | 186 | 8 | 38 | 126 | 186 |
|  | Storage modulus E'$_{120}$ (×10$^7$ dyn/cm$^2$) at 120° C. | 7.54 | 11.7 | 1.97 | 4.01 | 7.54 | 11.7 |
|  | Storage modulus E'$_{150}$ (×10$^7$ dyn/cm$^2$) at 150° C. | 7.55 | 11.1 | 1.91 | 3.95 | 7.55 | 11.1 |
|  | \|E'$_{120}$ − E'$_{150}$ (×10$^7$ dyn/cm$^2$)\| | 0.01 | 0.60 | 0.06 | 0.06 | 0.01 | 0.60 |
|  | Paint film thickness (μm) | 20 | 20 | 20 | 20 | 20 | 20 |
|  | Tan σ (10° C.) | 0.068 | 0.053 | 0.241 | 0.152 | 0.068 | 0.053 |
| Ball | Occupation ratio Y of dimple (%) | 68 | 68 | 73 | 73 | 73 | 73 |
|  | Tan σ × occupation ratio Y of dimple | 4.62 | 3.60 | 17.59 | 11.10 | 4.96 | 3.87 |
| Ball evaluation | Spin rate (rpm) on approach shots (21 m/s) | 6974 | 6854 | 6919 | 6900 | 6871 | 6502 |
|  | Spin rate (rpm) on approach shots (10 m/s) | 3664 | 3513 | 3785 | 3750 | 3616 | 3466 |
|  | Launch angle (°) (10 m/s) | 35.50 | 36.40 | 34.77 | 34.81 | 35.61 | 36.60 |
|  | Flight distance on driver shots (m) | 223 | 223 | 224 | 224 | 224 | 224 |

|  |  | Golf ball No. | | | | |
| --- | --- | --- | --- | --- | --- | --- |
|  |  | 118 | 119 | 120 | 121 | 122 |
| Paint film properties | Paint No. | B | B | CB | B | B |
|  | NCO/OH | 0.5/1.0 | 0.5/1.0 | 0.74/1.0 | 0.5/1.0 | 0.5/1.0 |
|  | Coefficient of Friction | 0.42 | 0.42 | 0.39 | 0.42 | 0.42 |
|  | Martens Hardness (mgf/μm$^2$) | 0.25 | 0.25 | 2.20 | 0.25 | 0.25 |
|  | 10% elastic modulus (kgf/cm$^2$) | 38 | 38 | 110 | 38 | 38 |
|  | Storage modulus E'$_{120}$ (×10$^7$ dyn/cm$^2$) at 120° C. | 4.01 | 4.01 | 7.06 | 4.01 | 4.01 |
|  | Storage modulus E'$_{150}$ (×10$^7$ dyn/cm$^2$) at 150° C. | 3.95 | 3.95 | 6.78 | 3.95 | 3.95 |
|  | \|E'$_{120}$ − E'$_{150}$ (×10$^7$ dyn/cm$^2$)\| | 0.06 | 0.06 | 0.28 | 0.06 | 0.06 |
|  | Paint film thickness (μm) | 30 | 40 | 20 | 20 | 20 |
|  | Tan σ (10° C.) | 0.152 | 0.152 | 0.070 | 0.152 | 0.152 |
| Ball | Occupation ratio Y of dimple (%) | 63 | 63 | 63 | 63 | 63 |
|  | Tan σ × occupation ratio Y of dimple | 9.58 | 9.58 | 4.41 | 9.58 | 9.58 |
| Ball evaluation | Spin rate (rpm) on approach shots (21 m/s) | 7335 | 7370 | 7282 | 7305 | 7310 |
|  | Spin rate (rpm) on approach shots (10 m/s) | 3995 | 4032 | 3916 | 3956 | 3962 |
|  | Launch angle (°) (10 m/s) | 34.01 | 33.95 | 34.47 | 34.15 | 34.10 |
|  | Flight distance on driver shots (m) | 222 | 222 | 222 | 223 | 224 |

TABLE 28

|  |  | Golf ball No. | | | | | | |
| --- | --- | --- | --- | --- | --- | --- | --- | --- |
|  |  | 123 | 124 | 125 | 126 | 127 | 128 | 129 |
| Paint film properties | Paint No. | A | B | C | S | U | T | V |
|  | NCO/OH | 0.38/1.0 | 0.5/1.0 | 0.8/1.0 | 1.2/1.0 | 0.07/1.0 | 0.5/1.0 | 0.2/1.0 |
|  | Coefficient of Friction | 0.46 | 0.42 | 0.38 | 0.32 | 0.65 | 0.61 | 0.55 |
|  | Martens Hardness (mgf/μm$^2$) | 0.14 | 0.25 | 2.80 | 4.30 | 0.03 | 0.07 | 0.09 |
|  | 10% elastic modulus (kgf/cm$^2$) | 8 | 38 | 126 | 186 | 0.5 | 2 | 5 |

TABLE 28-continued

| | | | | | | | | |
|---|---|---|---|---|---|---|---|---|
| | Storage modulus $E'_{120}$ (×$10^7$ dyn/cm$^2$) at 120° C. | 1.97 | 4.01 | 7.54 | 11.7 | 1.46 | 1.76 | 1.86 |
| | Storage modulus $E'_{150}$ (×$10^7$ dyn/cm$^2$) at 150° C. | 1.91 | 3.95 | 7.55 | 11.1 | 0.91 | 1.01 | 1.63 |
| | $\|E'_{120} - E'_{150}\|$ (×$10^7$ dyn/cm$^2$) | 0.06 | 0.06 | 0.01 | 0.60 | 0.91 | 0.75 | 0.23 |
| | Paint film thickness (μm) | 20 | 20 | 20 | 20 | 20 | 20 | 20 |
| | Tan σ (10° C.) | 0.241 | 0.152 | 0.068 | 0.053 | 0.28 | 0.25 | 0.230 |
| Ball | Occupation ratio Y of dimple (%) | 80 | 80 | 80 | 80 | 85 | 85 | 85 |
| | Tan σ × occupation ratio Y of dimple | 19.28 | 12.16 | 5.44 | 4.24 | 23.80 | 21.25 | 19.55 |
| Ball | Spin rate (rpm) on approach shots (21 m/s) | 6605 | 6591 | 6565 | 6445 | 6374 | 6383 | 6424 |
| evaluation | Spin rate (rpm) on approach shots (10 m/s) | 3484 | 3452 | 3316 | 3043 | 3166 | 3208 | 3292 |
| | Launch angle (°) (10 m/s) | 36.60 | 36.61 | 37.50 | 38.50 | 38.26 | 38.09 | 37.61 |
| | Flight distance on driver shots (m) | 225 | 225 | 225 | 225 | 226 | 226 | 226 |

| | | | Golf ball No. | | | | |
|---|---|---|---|---|---|---|---|
| | | | 130 | 131 | 132 | 133 | 134 |
| Paint film properties | Paint | Paint No. | A | B | C | S | D |
| | | NCO/OH | 0.38/1.0 | 0.5/1.0 | 0.8/1.0 | 1.2/1.0 | 1.6/1.0 |
| | | Coefficient of Friction | 0.46 | 0.42 | 0.38 | 0.32 | 0.28 |
| | | Martens Hardness (mgf/μm$^2$) | 0.14 | 0.25 | 2.80 | 4.30 | 6.5 |
| | | 10% elastic modulus (kgf/cm$^2$) | 8 | 38 | 126 | 186 | 275 |
| | | Storage modulus $E'_{120}$ (×$10^7$ dyn/cm$^2$) at 120° C. | 1.97 | 4.01 | 7.54 | 11.7 | 23.5 |
| | | Storage modulus $E'_{150}$ (×$10^7$ dyn/cm$^2$) at 150° C. | 1.91 | 3.95 | 7.55 | 11.1 | 16.2 |
| | | $\|E'_{120} - E'_{150}\|$ (×$10^7$ dyn/cm$^2$) | 0.06 | 0.06 | 0.01 | 0.60 | 7.30 |
| | | Paint film thickness (μm) | 20 | 20 | 20 | 20 | 20 |
| | | Tan σ (10° C.) | 0.241 | 0.152 | 0.068 | 0.053 | 0.045 |
| Ball | | Occupation ratio Y of dimple (%) | 85 | 85 | 85 | 85 | 85 |
| | | Tan σ × occupation ratio Y of dimple | 20.49 | 12.92 | 5.78 | 4.51 | 3.83 |
| Ball evaluation | | Spin rate (rpm) on approach shots (21 m/s) | 6414 | 6400 | 6374 | 6254 | 6056 |
| | | Spin rate (rpm) on approach shots (10 m/s) | 3282 | 3250 | 3114 | 2841 | 2768 |
| | | Launch angle (°) (10 m/s) | 37.71 | 37.78 | 38.10 | 39.70 | 40.00 |
| | | Flight distance on driver shots (m) | 226 | 226 | 226 | 226 | 226 |

TABLE 29

| | | | Golf ball No. | | | | | | |
|---|---|---|---|---|---|---|---|---|---|
| | | | 135 | 136 | 137 | 138 | 139 | 140 | 141 |
| Paint film properties | Paint | Paint No. | A | B | C | S | A | B | C |
| | | NCO/OH | 0.38/1.0 | 0.5/1.0 | 0.8/1.0 | 1.2/1.0 | 0.38/1.0 | 0.5/1.0 | 0.8/1.0 |
| | | Coefficient of Friction | 0.46 | 0.42 | 0.38 | 0.32 | 0.46 | 0.42 | 0.38 |
| | | Martens Hardness (mgf/μm$^2$) | 0.14 | 0.25 | 2.80 | 4.30 | 0.14 | 0.25 | 2.80 |
| | | 10% elastic modulus (kgf/cm$^2$) | 8 | 38 | 126 | 186 | 8 | 38 | 126 |
| | | Storage modulus $E'_{120}$ (×$10^7$ dyn/cm$^2$) at 120° C. | 1.97 | 4.01 | 7.54 | 11.7 | 1.97 | 4.01 | 7.54 |
| | | Storage modulus $E'_{150}$ (×$10^7$ dyn/cm$^2$) at 150° C. | 1.91 | 3.95 | 7.55 | 11.1 | 1.91 | 3.95 | 7.55 |
| | | $\|E'_{120} - E'_{150}\|$ (×$10^7$ dyn/cm$^2$) | 0.06 | 0.06 | 0.01 | 0.60 | 0.06 | 0.06 | 0.01 |
| | | Paint film thickness (μm) | 20 | 20 | 20 | 20 | 20 | 20 | 20 |
| | | Tan σ (10° C.) | 0.241 | 0.152 | 0.068 | 0.053 | 0.241 | 0.152 | 0.068 |
| Ball | | Occupation ratio Y of dimple (%) | 89 | 89 | 89 | 89 | 99 | 99 | 99 |
| | | Tan σ × occupation ratio Y of dimple | 21.45 | 13.53 | 6.05 | 4.72 | 23.86 | 15.05 | 6.73 |
| Ball evaluation | | Spin rate (rpm) on approach shots (21 m/s) | 6214 | 6200 | 6174 | 6054 | 6114 | 6100 | 6074 |
| | | Spin rate (rpm) on approach shots (10 m/s) | 3082 | 3050 | 2914 | 2641 | 2932 | 2900 | 2764 |
| | | Launch angle (°) (10 m/s) | 38.20 | 38.32 | 39.40 | 40.80 | 39.37 | 39.46 | 40.00 |
| | | Flight distance on driver shots (m) | 227 | 227 | 227 | 227 | 228 | 228 | 228 |

| | | | Golf ball No. | | | | | |
|---|---|---|---|---|---|---|---|---|
| | | | 142 | 143 | 144 | 145 | 146 | 147 |
| Paint film properties | Paint | Paint No. | S | B | B | CB | B | B |
| | | NCO/OH | 1.2/1.0 | 0.5/1.0 | 0.5/1.0 | 0.74/1.0 | 0.5/1.0 | 0.5/1.0 |
| | | Coefficient of Friction | 0.32 | 0.42 | 0.42 | 0.39 | 0.42 | 0.42 |
| | | Martens Hardness (mgf/μm$^2$) | 4.30 | 0.25 | 0.25 | 2.20 | 0.25 | 0.25 |
| | | 10% elastic modulus (kgf/cm$^2$) | 186 | 38 | 38 | 110 | 38 | 38 |
| | | Storage modulus $E'_{120}$ (×$10^7$ dyn/cm$^2$) at 120° C. | 11.7 | 4.01 | 4.01 | 7.06 | 4.01 | 4.01 |
| | | Storage modulus $E'_{150}$ (×$10^7$ dyn/cm$^2$) at 150° C. | 11.1 | 3.95 | 3.95 | 6.78 | 3.95 | 3.95 |

TABLE 29-continued

| | | | | | | | |
|---|---|---|---|---|---|---|---|
| | $|E'_{120} - E'_{150}|$ (×10⁷ dyn/cm²) | 0.60 | 0.06 | 0.06 | 0.28 | 0.06 | 0.06 |
| | Paint film thickness (μm) | 20 | 30 | 40 | 20 | 20 | 20 |
| | Tan σ (10° C.) | 0.053 | 0.152 | 0.152 | 0.070 | 0.152 | 0.152 |
| Ball | Occupation ratio Y of dimple (%) | 99 | 85 | 85 | 85 | 85 | 85 |
| | Tan σ × occupation ratio Y of dimple | 5.25 | 12.92 | 12.92 | 5.95 | 12.92 | 12.92 |
| Ball evaluation | Spin rate (rpm) on approach shots (21 m/s) | 5954 | 6440 | 6480 | 6388 | 6405 | 6409 |
| | Spin rate (rpm) on approach shots (10 m/s) | 2491 | 3300 | 3350 | 3211 | 3256 | 3266 |
| | Launch angle (°) (10 m/s) | 42.00 | 37.69 | 37.40 | 38.00 | 37.78 | 37.81 |
| | Flight distance on driver shots (m) | 228 | 226 | 226 | 226 | 227 | 228 |

The results of tables 16 to 29 indicate that the golf balls comprising a golf ball body and a paint film formed on a surface of the golf ball body, wherein the paint film has a storage modulus (E') at a temperature ranging from 120° C. to 150° C. measured under specific measurement conditions using a dynamic viscoelasticity measuring apparatus of 1.00× 10⁷ dyn/cm² or more and 1.00×10⁸ dyn/cm² or less and a loss tangent (tan δ) at the temperature of 10° C. of 0.050 or more have low launch angle and high spin rate on approach shots less than 40 yards, especially approach shots around the greens (about 10-yard to 20-yard), and are excellent in the controllability.

The present invention is useful for painted golf balls. This application is based on Japanese Patent applications No. 2012-131447, 2012-131448, 2012-131449, 2012-131450, 2012-136295, 2012-136296, 2012-136927, 2012-136928, the contents of which are hereby incorporated by reference.

The invention claimed is:

1. A golf ball comprising a golf ball body and a paint film formed on a surface of the golf ball body, wherein
    the paint film includes a base resin that is a polyurethane obtained by a reaction between a polyol and two or more polyisocyanates,
    the two or more polyisocyanates include a derivative of hexamethylene diisocyanate and a derivative of isophorone diisocyanate,
    a mixing ratio of the derivative of hexamethylene diisocyanate and the derivative of isophorone diisocyanate (HDI derivative/IPDI derivative) ranges from 80/20 to 50/50 in a mass ratio,
    the derivative of hexamethylene diisocyanate includes a biuret-modified product of hexamethylene diisocyanate and an isocyanurate of hexamethylene diisocyanate,
    the derivative of isophorone diisocyanate includes an isocyanurate of isophorone diisocyanate,
    the isocyanate groups (NCO) of the polyisocyanates and hydroxyl groups (OH) of the polyol have a molar ratio (NCO/OH) of 0.1 or more and 0.8 or less in the reaction between the polyisocyanates and the polyol, and
    the paint film has a storage modulus (E') in a temperature range from 120° C. to 150° C. of 1.00×10⁷ dyn/cm² or more and 1.00×10⁸ dyn/cm² or less, and a loss tangent (tan δ) at a temperature of 10° C. of 0.050 or more when measured in a tensile mode using a dynamic viscoelasticity measuring apparatus at a measuring temperature of −50° C. to 150° C., a temperature increase rate of 4° C./min, an oscillation frequency of 10 Hz, and a measuring strain of 0.1%.

2. The golf ball according to claim 1, wherein an absolute value ($|E'_{120}-E'_{150}|$) of a difference between a storage modulus ($E'_{120}$) at the temperature of 120° C. and a storage modulus ($E'_{150}$) at the temperature of 150° C. is 2.00×10⁷ dyn/cm² or less.

3. The golf ball according to claim 1, wherein the polyol includes a urethane polyol obtained by a reaction between a first polyol component and a first polyisocyanate component.

4. The golf ball according to claim 3, wherein the first polyol component used to make the urethane polyol includes a triol component and a diol component, and a mixing ratio (triol component/diol component) of the triol component to the diol component is 0.2 or more and 6.0 or less in a mass ratio.

5. The golf ball according to claim 1, wherein the paint film has a 10% elastic modulus of 2 kgf/cm² or more and 160 kgf/cm² or less.

6. The golf ball according to claim 1, wherein the paint film has a 10% elastic modulus of 2 kgf/cm² or more and 130 kgf/cm² or less.

7. The golf ball according to claim 1, wherein the paint film has a coefficient of friction calculated using a contact force tester of 0.35 or more and 0.60 or less.

8. The golf ball according to claim 1, wherein the paint film has a thickness of 10 μm or more and 50 μm or less.

9. The golf ball according to claim 1, wherein the golf ball body has a core and at least one cover layer enclosing the core, and the cover layer has a slab hardness in a range from 10 to 75 in Shore D hardness.

10. The golf ball according to claim 9, wherein the cover has a slab hardness of 10 or more and less than 55 in Shore D hardness.

11. The golf ball according to claim 9, wherein the cover has a slab hardness of 55 or more and 75 or less in Shore D hardness.

12. The golf ball according to claim 1, wherein the golf ball has a compression deformation amount in a range from 1.7 mm to 4.5 mm when applying a load from an initial load of 98N to a final load of 1275 N.

13. The golf ball according to claim 12, wherein a product of the loss tangent (tan δ) at the temperature of 10° C. and the compression deformation amount ranges from 0.14 to 0.68.

14. The golf ball according to claim 1, wherein the golf ball has a compression deformation amount of 1.7 mm or more and less than 3.0 mm when applying a load from an initial load of 98N to a final load of 1275 N.

15. The golf ball according to claim 14, wherein a product of the loss tangent (tan δ) at the temperature of 10° C. and the compression deformation amount ranges from 0.14 to 0.65.

16. The golf ball according to claim 1, wherein the golf ball has a compression deformation amount in a range from 3.0 mm to 4.5 mm when applying a load from an initial load of 98N to a final load of 1275 N.

17. The golf ball according to claim 16, wherein a product of the loss tangent (tan δ) at the temperature of 10° C. and the compression deformation amount ranges from 0.23 to 0.68.

18. The golf ball according to claim 1, wherein the golf ball body has a plurality of dimples on a surface thereof and an occupation ratio Y of all the dimples of 60% or more and 95% or less.

19. The golf ball according to claim 18, wherein the golf ball body has the occupation ratio Y of 60% or more and less than 75%.

20. The golf ball according to claim 19, wherein the loss tangent (tan δ) and the occupation ratio Y satisfy the following equation:

$$4.28 \leq (\tan \delta)(Y) \leq 17.59.$$

21. The golf ball according to claim 18, wherein the golf ball body has the occupation ratio Y of 75% or more and 95% or less.

22. The golf ball according to claim 21, wherein the loss tangent (tan δ) and the occupation ratio Y satisfy the following equation:

$$5.44 \leq (\tan \delta)(Y) \leq 21.4.$$

23. The golf ball according to claim 1, wherein a mixing ratio (biuret-modified product/isocyanurate) of the biuret-modified product of hexamethylene diisocyanate to the isocyanurate of hexamethylene diisocyanate ranges from 20/40 to 40/20 in a mass ratio.

* * * * *